United States Patent
Tutunoglu

(10) Patent No.: US 9,568,206 B2
(45) Date of Patent: Feb. 14, 2017

(54) METHOD AND APPARATUS FOR COOLING

(75) Inventor: Ozan Tutunoglu, O'Fallon, MO (US)

(73) Assignee: SCHNEIDER ELECTRIC IT CORPORATION, West Kingston, RI (US)

(*) Notice: Subject to any disclaimer, the term of this patent is extended or adjusted under 35 U.S.C. 154(b) by 839 days.

(21) Appl. No.: 12/545,106

(22) Filed: Aug. 21, 2009

(65) Prior Publication Data
US 2010/0057263 A1 Mar. 4, 2010

Related U.S. Application Data

(63) Continuation-in-part of application No. 12/137,177, filed on Jun. 11, 2008, now Pat. No. 8,322,155, and a
(Continued)

(51) Int. Cl.
*F25B 41/00* (2006.01)
*F25B 49/00* (2006.01)
(Continued)

(52) U.S. Cl.
CPC ......... *F24F 11/0086* (2013.01); *F25B 49/027* (2013.01); *F24F 2011/0091* (2013.01);
(Continued)

(58) Field of Classification Search
CPC ................. F25B 41/043; F25B 47/022; F25B 2313/0232; F25B 2313/24; F25B 2313/0403; F25B 2400/0403; F25B 240/0403; F25B 2600/02; F25B 2600/027; F25B 2600/0271; F25B 2700/1931; F25B 2700/33; F25B 2500/27
(Continued)

(56) References Cited

U.S. PATENT DOCUMENTS 1,025,243 A 5/1912 Carpenter et al.
1,941,258 A 12/1933 Gordon
(Continued)

FOREIGN PATENT DOCUMENTS

CN 1485906 A 3/2004
CN 2612211 Y 4/2004
(Continued)

OTHER PUBLICATIONS

"Management Strategy for Network Critical Physical Infrastructure", White Paper #100, pp. 110, American Power Conversion, Dec. 15, 2003, published on World Wide Web.
(Continued)

*Primary Examiner* — Marc Norman
*Assistant Examiner* — Daniel C Comings
(74) *Attorney, Agent, or Firm* — Lando & Anastasi, LLP

(57) ABSTRACT

Methods of controlling a cooling unit and embodiments of a cooling unit are disclosed. A method of improving efficiency of the cooling unit includes detecting a degree of opening of a hot gas bypass valve configured to divert a portion of coolant from a compressor to a heat exchanger of the cooling unit, and adjusting a condenser discharge pressure based on the detected degree of opening. Aspects may increase cooling efficiency at partial cooling requirements. Fluctuations in refrigerant pressure at low cooling capacities and condenser medium inlet temperature may be avoided. Minimum condenser water inlet temperature for a water-cooled cooling unit may also be reduced.

13 Claims, 9 Drawing Sheets

Related U.S. Application Data continuation-in-part of application No. 11/504,370, filed on Aug. 15, 2006, now Pat. No. 8,327,656.

(51) Int. Cl.
  *F25B 1/00* (2006.01)
  *F24F 11/00* (2006.01)
  *F25B 49/02* (2006.01)
  *F25B 47/02* (2006.01)

(52) U.S. Cl.
  CPC ..... *F25B 47/022* (2013.01); *F25B 2313/0232* (2013.01); *F25B 2313/02322* (2013.01); *F25B 2400/0403* (2013.01); *F25B 2500/18* (2013.01); *F25B 2500/19* (2013.01); *F25B 2600/02* (2013.01); *F25B 2600/027* (2013.01); *F25B 2600/0271* (2013.01); *F25B 2600/111* (2013.01); *F25B 2600/112* (2013.01); *F25B 2600/2501* (2013.01); *F25B 2700/13* (2013.01); *F25B 2700/1931* (2013.01); *F25B 2700/1933* (2013.01); *Y02B 30/743* (2013.01)

(58) Field of Classification Search
  USPC .......... 62/196.1, 196.4, 215, 228.1, 228.3,62/228.5; 236/12.1
  See application file for complete search history.

(56) References Cited

U.S. PATENT DOCUMENTS

| | | |
|---|---|---|
| 2,455,022 A | 11/1948 | Schmidt |
| 3,317,798 A | 5/1967 | Chu et al. |
| 3,559,728 A | 2/1971 | Lyman et al. |
| 3,643,007 A | 2/1972 | Roberts et al. |
| 3,665,725 A * | 5/1972 | Barlass et al. ............ 62/196.4 |
| 3,681,936 A | 8/1972 | Park |
| 3,742,725 A | 7/1973 | Berger |
| 3,995,446 A | 12/1976 | Eubank |
| 4,055,053 A | 10/1977 | Elfving et al. |
| 4,127,008 A | 11/1978 | Tyree, Jr. |
| 4,197,716 A | 4/1980 | Nussbaum |
| 4,223,535 A | 9/1980 | Kumm |
| 4,275,570 A | 6/1981 | Szymaszek et al. |
| 4,285,205 A | 8/1981 | Martin et al. |
| 4,338,794 A * | 7/1982 | Haasis, Jr. ............ 62/348 |
| 4,419,865 A | 12/1983 | Szymaszek |
| 4,515,746 A | 5/1985 | Brun et al. |
| 4,590,538 A | 5/1986 | Cray, Jr. |
| 4,599,873 A | 7/1986 | Hyde |
| 4,696,168 A | 9/1987 | Woods et al. |
| 4,718,249 A | 1/1988 | Hanson |
| 4,747,041 A | 5/1988 | Engel et al. |
| 4,774,631 A | 9/1988 | Okuyama et al. |
| 4,823,247 A | 4/1989 | Tamoto |
| 4,823,290 A | 4/1989 | Fasack et al. |
| 4,827,151 A | 5/1989 | Okado |
| 4,827,733 A | 5/1989 | Dinh |
| 4,831,508 A | 5/1989 | Hunter |
| 4,837,663 A | 6/1989 | Zushi et al. |
| 4,911,231 A | 3/1990 | Horne et al. |
| 4,937,505 A | 6/1990 | Deglon et al. |
| 4,944,158 A | 7/1990 | Akiike et al. |
| 4,962,734 A | 10/1990 | Jorgensen |
| 4,980,812 A | 12/1990 | Johnson, Jr. et al. |
| 5,017,800 A | 5/1991 | Divan |
| 5,019,717 A | 5/1991 | McCurry et al. |
| 5,057,968 A | 10/1991 | Morrison |
| 5,095,712 A | 3/1992 | Narreau |
| 5,097,328 A | 3/1992 | Boyette |
| 5,126,585 A | 6/1992 | Boys |
| 5,150,580 A | 9/1992 | Hyde |
| 5,153,837 A | 10/1992 | Shaffer et al. |
| 5,158,132 A | 10/1992 | Guillemot |
| 5,168,724 A | 12/1992 | Gilbertson et al. |
| 5,173,819 A | 12/1992 | Takahashi et al. |
| 5,177,666 A | 1/1993 | Bland et al. |
| 5,181,653 A | 1/1993 | Foster et al. |
| 5,195,706 A | 3/1993 | Allen |
| 5,216,623 A | 6/1993 | Barrett et al. |
| 5,234,185 A | 8/1993 | Hoffman et al. |
| 5,269,372 A | 12/1993 | Chu et al. |
| 5,367,670 A | 11/1994 | Ward et al. |
| 5,381,554 A | 1/1995 | Langer et al. |
| 5,382,943 A | 1/1995 | Tanaka |
| 5,388,422 A | 2/1995 | Hayashida et al. |
| 5,404,136 A | 4/1995 | Marsden |
| 5,462,225 A | 10/1995 | Massara et al. |
| 5,507,529 A | 4/1996 | Martins |
| 5,519,306 A | 5/1996 | Itoh et al. |
| 5,528,507 A | 6/1996 | McNamara et al. |
| 5,533,357 A | 7/1996 | Voorhis |
| 5,572,873 A | 11/1996 | Lavigne et al. |
| 5,581,478 A | 12/1996 | Cruse et al. |
| 5,582,020 A | 12/1996 | Scaringe et al. |
| 5,649,428 A | 7/1997 | Calton et al. |
| 5,654,591 A | 8/1997 | Mabboux et al. |
| 5,657,641 A | 8/1997 | Cunningham et al. |
| 5,682,949 A | 11/1997 | Ratcliffe et al. |
| 5,684,686 A | 11/1997 | Reddy |
| 5,694,780 A | 12/1997 | Alsenz |
| 5,704,219 A | 1/1998 | Suzuki et al. |
| 5,718,628 A | 2/1998 | Nakazato et al. |
| 5,735,134 A | 4/1998 | Liu et al. |
| 5,749,237 A | 5/1998 | Sandofsky et al. |
| 5,794,897 A | 8/1998 | Jobin et al. |
| 5,802,856 A | 9/1998 | Schaper et al. |
| 5,845,090 A | 12/1998 | Collins, III et al. |
| 5,850,539 A | 12/1998 | Cook et al. |
| 5,860,012 A | 1/1999 | Luu |
| 5,860,280 A | 1/1999 | Recine, Sr. et al. |
| 5,896,922 A | 4/1999 | Chrysler et al. |
| 5,949,974 A | 9/1999 | Ewing et al. |
| 5,953,930 A | 9/1999 | Chu et al. |
| 5,954,127 A | 9/1999 | Chrysler et al. |
| 5,959,240 A | 9/1999 | Yoshida et al. |
| 5,960,204 A | 9/1999 | Yinger et al. |
| 5,963,425 A | 10/1999 | Chrysler et al. |
| 5,963,457 A | 10/1999 | Kanoi et al. |
| 5,970,731 A | 10/1999 | Hare et al. |
| 5,970,734 A | 10/1999 | Stillwell et al. |
| 5,972,196 A | 10/1999 | Murphy et al. |
| 5,974,237 A | 10/1999 | Shurmer et al. |
| 5,978,594 A | 11/1999 | Bonnell et al. |
| 5,978,912 A | 11/1999 | Rakavy et al. |
| 5,982,652 A | 11/1999 | Simonelli et al. |
| 5,984,144 A | 11/1999 | Wyatt |
| 5,987,614 A | 11/1999 | Mitchell et al. |
| 5,995,729 A | 11/1999 | Hirosawa et al. |
| 6,023,935 A | 2/2000 | Okazaki et al. |
| 6,032,472 A | 3/2000 | Heinrichs et al. |
| 6,034,872 A | 3/2000 | Chrysler et al. |
| 6,038,879 A | 3/2000 | Turcotte et al. |
| 6,055,480 A | 4/2000 | Nevo et al. |
| 6,085,243 A | 7/2000 | Fletcher et al. |
| 6,088,225 A | 7/2000 | Parry et al. |
| 6,104,868 A | 8/2000 | Peters et al. |
| 6,105,061 A | 8/2000 | Nakai |
| 6,108,782 A | 8/2000 | Fletcher et al. |
| 6,111,036 A | 8/2000 | Wonders et al. |
| 6,112,235 A | 8/2000 | Spofford |
| 6,134,511 A | 10/2000 | Subbarao |
| 6,141,762 A | 10/2000 | Nicol et al. |
| 6,189,109 B1 | 2/2001 | Sheikh et al. |
| 6,199,204 B1 | 3/2001 | Donohue |
| 6,208,510 B1 | 3/2001 | Trudeau et al. |
| 6,209,330 B1 | 4/2001 | Timmerman et al. |
| 6,213,194 B1 | 4/2001 | Chrysler et al. |
| 6,216,482 B1 | 4/2001 | Xiao et al. |
| 6,216,956 B1 | 4/2001 | Ehlers et al. |
| 6,223,810 B1 | 5/2001 | Chu et al. |
| 6,237,353 B1 | 5/2001 | Sishtla et al. |
| 6,246,969 B1 | 6/2001 | Sinclair et al. |
| 6,266,721 B1 | 7/2001 | Sheikh et al. |

(56) References Cited

U.S. PATENT DOCUMENTS

| | | |
|---|---|---|
| 6,276,161 B1 | 8/2001 | Peiffer et al. |
| 6,281,790 B1 | 8/2001 | Kimmel et al. |
| 6,305,180 B1 | 10/2001 | Miller et al. |
| 6,327,143 B1 | 12/2001 | Bonstrom et al. |
| 6,332,202 B1 | 12/2001 | Sheikh et al. |
| 6,332,335 B1 | 12/2001 | Kajimoto et al. |
| 6,347,627 B1 | 2/2002 | Frankie et al. |
| 6,363,421 B2 | 3/2002 | Barker et al. |
| 6,374,627 B1 | 4/2002 | Schumacher et al. |
| 6,381,700 B1 | 4/2002 | Yoshida |
| 6,389,464 B1 | 5/2002 | Krishnamurthy et al. |
| 6,415,628 B1 | 7/2002 | Ahmed et al. |
| 6,438,978 B1 | 8/2002 | Bessler |
| 6,457,076 B1 | 9/2002 | Cheng et al. |
| 6,459,579 B1 | 10/2002 | Farmer et al. |
| 6,474,087 B1 | 11/2002 | Lifson |
| 6,483,730 B2 | 11/2002 | Johnson, Jr. |
| 6,494,050 B2 | 12/2002 | Spinazzola et al. |
| 6,557,624 B1 | 5/2003 | Stahl et al. |
| 6,574,104 B2 | 6/2003 | Patel et al. |
| 6,575,234 B2 | 6/2003 | Nelson |
| 6,640,889 B1 | 11/2003 | Harte et al. |
| 6,661,678 B2 | 12/2003 | Raddi et al. |
| 6,662,576 B1 | 12/2003 | Bai |
| 6,668,565 B1 | 12/2003 | Johnson et al. |
| 6,672,955 B2 | 1/2004 | Charron |
| 6,682,100 B2 | 1/2004 | Wood et al. |
| 6,694,759 B1 * | 2/2004 | Bash et al. ............ 62/180 |
| 6,695,577 B1 | 2/2004 | Susek |
| 6,714,977 B1 | 3/2004 | Fowler et al. |
| 6,718,277 B2 | 4/2004 | Sharma |
| 6,718,781 B2 | 4/2004 | Freund et al. |
| 6,721,672 B2 | 4/2004 | Spitaels et al. |
| 6,745,579 B2 | 6/2004 | Spinazzola et al. |
| 6,745,590 B1 | 6/2004 | Johnson et al. |
| 6,761,212 B2 | 7/2004 | DiPaolo |
| 6,775,137 B2 | 8/2004 | Chu et al. |
| 6,795,928 B2 | 9/2004 | Bradley et al. |
| 6,804,616 B2 | 10/2004 | Bodas |
| 6,804,975 B2 | 10/2004 | Park |
| 6,814,134 B1 | 11/2004 | Pravda |
| 6,819,563 B1 | 11/2004 | Chu et al. |
| 6,827,142 B2 | 12/2004 | Winkler et al. |
| 6,829,630 B1 | 12/2004 | Pajak et al. |
| 6,832,504 B1 | 12/2004 | Birkmann |
| 6,848,989 B2 | 2/2005 | Miyazaki et al. |
| 6,859,366 B2 | 2/2005 | Fink |
| 6,859,882 B2 | 2/2005 | Fung |
| 6,862,179 B2 | 3/2005 | Beitelmal et al. |
| 6,880,349 B2 | 4/2005 | Johnson et al. |
| 6,881,142 B1 | 4/2005 | Nair |
| 6,886,353 B2 | 5/2005 | Patel et al. |
| 6,889,908 B2 | 5/2005 | Crippen et al. |
| 6,901,767 B2 | 6/2005 | Wood |
| 6,924,981 B2 | 8/2005 | Chu et al. |
| 6,927,980 B2 | 8/2005 | Fukuda et al. |
| 6,944,035 B2 | 9/2005 | Raddi et al. |
| 6,955,058 B2 | 10/2005 | Taras et al. |
| 6,959,558 B2 | 11/2005 | Bean, Jr. et al. |
| 6,964,539 B2 | 11/2005 | Bradley et al. |
| 6,967,283 B2 | 11/2005 | Rasmussen et al. |
| 6,967,841 B1 | 11/2005 | Chu et al. |
| 6,973,797 B2 | 12/2005 | Nemit, Jr. |
| 6,973,801 B1 | 12/2005 | Campbell et al. |
| 6,980,433 B2 | 12/2005 | Fink |
| 7,000,416 B2 | 2/2006 | Hirooka et al. |
| 7,000,467 B2 | 2/2006 | Chu et al. |
| 7,012,807 B2 | 3/2006 | Chu et al. |
| 7,012,825 B2 | 3/2006 | Nielsen |
| 7,020,586 B2 | 3/2006 | Snevely |
| 7,031,870 B2 | 4/2006 | Sharma et al. |
| 7,032,119 B2 | 4/2006 | Fung |
| 7,033,267 B2 | 4/2006 | Rasmussen |
| 7,046,514 B2 | 5/2006 | Fink et al. |
| 7,047,300 B1 | 5/2006 | Oehrke et al. |
| 7,051,802 B2 | 5/2006 | Baer |
| 7,051,946 B2 | 5/2006 | Bash et al. |
| 7,065,600 B2 | 6/2006 | Papa et al. |
| 7,082,541 B2 | 7/2006 | Hammond et al. |
| 7,085,133 B2 | 8/2006 | Hall |
| 7,086,247 B2 | 8/2006 | Campbell et al. |
| 7,091,625 B2 | 8/2006 | Okusawa et al. |
| 7,104,081 B2 | 9/2006 | Chu et al. |
| 7,106,590 B2 | 9/2006 | Chu et al. |
| 7,112,131 B2 | 9/2006 | Rasmussen et al. |
| 7,120,021 B2 | 10/2006 | Hamman |
| 7,120,689 B2 | 10/2006 | Gonsalves et al. |
| 7,140,193 B2 | 11/2006 | Johnson et al. |
| 7,145,772 B2 | 12/2006 | Fink |
| 7,146,353 B2 | 12/2006 | Garg et al. |
| 7,148,796 B2 | 12/2006 | Joy et al. |
| 7,155,318 B2 | 12/2006 | Sharma et al. |
| 7,165,412 B1 | 1/2007 | Bean, Jr. |
| 7,173,820 B2 | 2/2007 | Fink et al. |
| 7,184,269 B2 | 2/2007 | Campbell et al. |
| 7,187,549 B2 | 3/2007 | Teneketges et al. |
| 7,197,433 B2 | 3/2007 | Patel et al. |
| 7,228,707 B2 | 6/2007 | Lifson et al. |
| 7,236,363 B2 | 6/2007 | Belady |
| 7,251,547 B2 | 7/2007 | Bash et al. |
| 7,254,307 B2 | 8/2007 | Xin |
| 7,259,963 B2 | 8/2007 | Germagian et al. |
| 7,270,174 B2 | 9/2007 | Chu et al. |
| 7,272,005 B2 | 9/2007 | Campbell et al. |
| 7,274,566 B2 | 9/2007 | Campbell et al. |
| 7,278,273 B1 | 10/2007 | Whitted et al. |
| 7,284,379 B2 | 10/2007 | Pham et al. |
| 7,292,898 B2 | 11/2007 | Clark et al. |
| 7,293,666 B2 | 11/2007 | Mattlin et al. |
| 7,298,617 B2 | 11/2007 | Campbell et al. |
| 7,298,618 B2 | 11/2007 | Campbell et al. |
| 7,313,503 B2 | 12/2007 | Nakagawa et al. |
| 7,315,448 B1 | 1/2008 | Bash et al. |
| 7,319,594 B2 | 1/2008 | Nicolai et al. |
| 7,365,973 B2 | 4/2008 | Rasmussen et al. |
| 7,366,632 B2 | 4/2008 | Hamann et al. |
| 7,403,391 B2 | 7/2008 | Germagian et al. |
| 7,406,839 B2 | 8/2008 | Bean et al. |
| 7,418,825 B1 | 9/2008 | Bean, Jr. |
| 7,421,575 B2 | 9/2008 | Ang et al. |
| 7,426,453 B2 | 9/2008 | Patel et al. |
| 7,462,453 B2 | 12/2008 | Yamada et al. |
| 7,472,043 B1 | 12/2008 | Low et al. |
| 7,558,649 B1 | 7/2009 | Sharma et al. |
| 7,568,360 B1 | 8/2009 | Bash et al. |
| 7,596,476 B2 | 9/2009 | Rasmussen et al. |
| 7,620,480 B2 | 11/2009 | Patel et al. |
| 7,676,280 B1 | 3/2010 | Bash et al. |
| 7,681,404 B2 | 3/2010 | Bean, Jr. |
| 7,705,489 B2 | 4/2010 | Nielsen et al. |
| 7,726,144 B2 | 6/2010 | Larson et al. |
| 7,775,055 B2 | 8/2010 | Bean et al. |
| 7,881,910 B2 | 2/2011 | Rasmussen et al. |
| 7,885,795 B2 | 2/2011 | Rasmussen et al. |
| 7,979,250 B2 | 7/2011 | Archibald et al. |
| 8,322,155 B2 | 12/2012 | Tutunoglu et al. |
| 8,327,656 B2 | 12/2012 | Tutunoglu et al. |
| 2001/0005894 A1 | 6/2001 | Fukui |
| 2001/0042616 A1 | 11/2001 | Baer |
| 2001/0047213 A1 | 11/2001 | Sepe |
| 2001/0047387 A1 | 11/2001 | Brockhurst |
| 2001/0047410 A1 | 11/2001 | Defosse |
| 2001/0052006 A1 | 12/2001 | Barker et al. |
| 2001/0055965 A1 | 12/2001 | Delp et al. |
| 2002/0004912 A1 | 1/2002 | Fung |
| 2002/0023258 A1 | 2/2002 | Elwahab et al. |
| 2002/0043969 A1 | 4/2002 | Duncan et al. |
| 2002/0055909 A1 | 5/2002 | Fung et al. |
| 2002/0059804 A1 | 5/2002 | Spinazzola et al. |
| 2002/0062454 A1 | 5/2002 | Fung |
| 2002/0071031 A1 | 6/2002 | Lord et al. |
| 2002/0072868 A1 | 6/2002 | Bartone et al. |
| 2002/0112054 A1 | 8/2002 | Hatanaka |
| 2002/0124081 A1 | 9/2002 | Primm et al. |

(56) References Cited

U.S. PATENT DOCUMENTS

| | | |
|---|---|---|
| 2002/0129355 A1 | 9/2002 | Velten et al. |
| 2002/0130648 A1 | 9/2002 | Raddi et al. |
| 2002/0134096 A1 | 9/2002 | Shim et al. |
| 2002/0134567 A1 | 9/2002 | Rasmussen et al. |
| 2002/0149911 A1 | 10/2002 | Bishop et al. |
| 2002/0161885 A1 | 10/2002 | Childers et al. |
| 2003/0019221 A1 | 1/2003 | Rossi et al. |
| 2003/0042004 A1 | 3/2003 | Novotny et al. |
| 2003/0084357 A1 | 5/2003 | Bresniker et al. |
| 2003/0084358 A1 | 5/2003 | Bresniker et al. |
| 2003/0084359 A1 | 5/2003 | Bresniker et al. |
| 2003/0115000 A1 | 6/2003 | Bodas |
| 2003/0115024 A1 | 6/2003 | Snevely |
| 2003/0120780 A1 | 6/2003 | Zhu et al. |
| 2003/0121689 A1 | 7/2003 | Rasmussen et al. |
| 2003/0147214 A1 | 8/2003 | Patel et al. |
| 2003/0147216 A1 | 8/2003 | Patel et al. |
| 2003/0154285 A1 | 8/2003 | Berglund et al. |
| 2003/0158718 A1 | 8/2003 | Nakagawa et al. |
| 2003/0184975 A1 | 10/2003 | Steinman et al. |
| 2003/0188208 A1 | 10/2003 | Fung |
| 2003/0193777 A1 | 10/2003 | Friedrich et al. |
| 2003/0196126 A1 | 10/2003 | Fung |
| 2003/0200130 A1 | 10/2003 | Kall et al. |
| 2003/0200295 A1 | 10/2003 | Roberts et al. |
| 2003/0200473 A1 | 10/2003 | Fung |
| 2003/0204756 A1 | 10/2003 | Ransom et al. |
| 2003/0236822 A1 | 12/2003 | Graupner et al. |
| 2004/0003266 A1 | 1/2004 | Moshir et al. |
| 2004/0010569 A1 | 1/2004 | Thomas et al. |
| 2004/0016243 A1 | 1/2004 | Song et al. |
| 2004/0020224 A1 | 2/2004 | Bash et al. |
| 2004/0031280 A1 | 2/2004 | Martin et al. |
| 2004/0031282 A1 | 2/2004 | Kopko |
| 2004/0061030 A1 | 4/2004 | Goodwin et al. |
| 2004/0065097 A1 | 4/2004 | Bash et al. |
| 2004/0065100 A1 | 4/2004 | Jacobsen |
| 2004/0065104 A1 | 4/2004 | Bash et al. |
| 2004/0073597 A1 | 4/2004 | Caveney et al. |
| 2004/0075343 A1 | 4/2004 | Wareham et al. |
| 2004/0075984 A1 | 4/2004 | Bash et al. |
| 2004/0078708 A1 | 4/2004 | Li et al. |
| 2004/0083012 A1 | 4/2004 | Miller |
| 2004/0084967 A1 | 5/2004 | Nielsen |
| 2004/0089009 A1 | 5/2004 | Bash et al. |
| 2004/0089011 A1 | 5/2004 | Patel et al. |
| 2004/0098991 A1 | 5/2004 | Heyes |
| 2004/0099747 A1 | 5/2004 | Johnson et al. |
| 2004/0100770 A1 | 5/2004 | Chu et al. |
| 2004/0120855 A1 | 6/2004 | Reichel et al. |
| 2004/0155526 A1 | 8/2004 | Naden et al. |
| 2004/0163001 A1 | 8/2004 | Bodas |
| 2004/0184232 A1 | 9/2004 | Fink |
| 2004/0186905 A1 | 9/2004 | Young et al. |
| 2004/0189161 A1 | 9/2004 | Davis et al. |
| 2004/0190247 A1 | 9/2004 | Chu et al. |
| 2004/0223300 A1 | 11/2004 | Fink et al. |
| 2004/0230848 A1 | 11/2004 | Mayo et al. |
| 2004/0240514 A1 | 12/2004 | Bash et al. |
| 2004/0262409 A1 | 12/2004 | Crippen et al. |
| 2005/0016189 A1 | 1/2005 | Wacker |
| 2005/0023363 A1 | 2/2005 | Sharma et al. |
| 2005/0044882 A1 | 3/2005 | Hong et al. |
| 2005/0055590 A1 | 3/2005 | Farkas et al. |
| 2005/0061013 A1 | 3/2005 | Bond |
| 2005/0071699 A1 | 3/2005 | Hammond et al. |
| 2005/0108582 A1 | 5/2005 | Fung |
| 2005/0111669 A1 | 5/2005 | Park et al. |
| 2005/0114507 A1 | 5/2005 | Tarui et al. |
| 2005/0132729 A1 | 6/2005 | Manole |
| 2005/0170770 A1 | 8/2005 | Johnson et al. |
| 2005/0177755 A1 | 8/2005 | Fung |
| 2005/0182523 A1 | 8/2005 | Nair |
| 2005/0185654 A1 | 8/2005 | Zadikian et al. |
| 2005/0198247 A1 | 9/2005 | Perry et al. |
| 2005/0198981 A1* | 9/2005 | Arno ............... F25B 49/025 62/229 |
| 2005/0207909 A1 | 9/2005 | Bean et al. |
| 2005/0210905 A1 | 9/2005 | Burns et al. |
| 2005/0213306 A1 | 9/2005 | Vos et al. |
| 2005/0225936 A1 | 10/2005 | Day |
| 2005/0228618 A1 | 10/2005 | Patel et al. |
| 2005/0235671 A1 | 10/2005 | Belady et al. |
| 2005/0237715 A1 | 10/2005 | Staben et al. |
| 2005/0237716 A1 | 10/2005 | Chu et al. |
| 2005/0246431 A1 | 11/2005 | Spitaels |
| 2005/0247829 A1 | 11/2005 | Low et al. |
| 2005/0248922 A1 | 11/2005 | Chu et al. |
| 2005/0251802 A1 | 11/2005 | Bozek et al. |
| 2005/0267639 A1 | 12/2005 | Sharma et al. |
| 2005/0284169 A1 | 12/2005 | Tamura et al. |
| 2006/0002086 A1 | 1/2006 | Teneketges et al. |
| 2006/0015712 A1 | 1/2006 | Ang et al. |
| 2006/0025010 A1 | 2/2006 | Spitaels et al. |
| 2006/0042289 A1 | 3/2006 | Campbell et al. |
| 2006/0072262 A1 | 4/2006 | Paik et al. |
| 2006/0080001 A1 | 4/2006 | Bash et al. |
| 2006/0081545 A1 | 4/2006 | Rassmussen et al. |
| 2006/0082263 A1 | 4/2006 | Rimler et al. |
| 2006/0096306 A1 | 5/2006 | Okaza et al. |
| 2006/0102575 A1 | 5/2006 | Mattlin et al. |
| 2006/0108481 A1 | 5/2006 | Riedy et al. |
| 2006/0112286 A1 | 5/2006 | Whalley et al. |
| 2006/0115586 A1 | 6/2006 | Xing et al. |
| 2006/0121421 A1 | 6/2006 | Spitaels et al. |
| 2006/0126296 A1 | 6/2006 | Campbell et al. |
| 2006/0139877 A1 | 6/2006 | Germagian et al. |
| 2006/0144073 A1 | 7/2006 | Lee et al. |
| 2006/0162357 A1 | 7/2006 | Fink et al. |
| 2006/0168975 A1 | 8/2006 | Malone et al. |
| 2006/0203834 A1 | 9/2006 | Augustinus |
| 2006/0214014 A1 | 9/2006 | Bash et al. |
| 2006/0232945 A1 | 10/2006 | Chu et al. |
| 2006/0238941 A1 | 10/2006 | Ingemi et al. |
| 2006/0242288 A1 | 10/2006 | Masurkar |
| 2006/0250770 A1 | 11/2006 | Campbell et al. |
| 2006/0260338 A1 | 11/2006 | VanGilder et al. |
| 2006/0276121 A1 | 12/2006 | Rasmussen |
| 2007/0025271 A1 | 2/2007 | Niedrich et al. |
| 2007/0038414 A1 | 2/2007 | Rasmussen et al. |
| 2007/0072536 A1 | 3/2007 | Johnson et al. |
| 2007/0074537 A1 | 4/2007 | Bean et al. |
| 2007/0076373 A1 | 4/2007 | Fink |
| 2007/0078635 A1 | 4/2007 | Rasmussen et al. |
| 2007/0081302 A1 | 4/2007 | Nicolai et al. |
| 2007/0085678 A1 | 4/2007 | Joy et al. |
| 2007/0088822 A1 | 4/2007 | Coile et al. |
| 2007/0091569 A1 | 4/2007 | Campbell et al. |
| 2007/0091570 A1 | 4/2007 | Campbell et al. |
| 2007/0121295 A1 | 5/2007 | Campbell et al. |
| 2007/0129000 A1 | 6/2007 | Rasmussen et al. |
| 2007/0146994 A1 | 6/2007 | Germagian et al. |
| 2007/0150215 A1 | 6/2007 | Spitaels et al. |
| 2007/0150584 A1 | 6/2007 | Srinivasan |
| 2007/0163748 A1 | 7/2007 | Rasmussen et al. |
| 2007/0165377 A1 | 7/2007 | Rasmussen et al. |
| 2007/0167125 A1 | 7/2007 | Rasmussen et al. |
| 2007/0171613 A1 | 7/2007 | McMahan et al. |
| 2007/0174024 A1 | 7/2007 | Rasmussen et al. |
| 2007/0187343 A1 | 8/2007 | Colucci et al. |
| 2007/0190919 A1 | 8/2007 | Donovan et al. |
| 2007/0213000 A1 | 9/2007 | Day |
| 2007/0271475 A1 | 11/2007 | Hataski et al. |
| 2007/0274035 A1 | 11/2007 | Fink et al. |
| 2008/0002364 A1 | 1/2008 | Campbell et al. |
| 2008/0004837 A1 | 1/2008 | Zwinger et al. |
| 2008/0037217 A1 | 2/2008 | Murakami et al. |
| 2008/0041076 A1 | 2/2008 | Tutunoglu et al. |
| 2008/0041077 A1 | 2/2008 | Tutunoglu |
| 2008/0055852 A1 | 3/2008 | Uluc et al. |
| 2008/0104985 A1 | 5/2008 | Carlsen |
| 2008/0105412 A1 | 5/2008 | Carlsen et al. |
| 2008/0105753 A1 | 5/2008 | Carlsen et al. |
| 2008/0141703 A1 | 6/2008 | Bean, Jr. |

(56) References Cited

U.S. PATENT DOCUMENTS

| | | |
|---|---|---|
| 2008/0142068 A1 | 6/2008 | Bean et al. |
| 2008/0174954 A1 | 7/2008 | VanGilder et al. |
| 2008/0177424 A1 | 7/2008 | Wheeler |
| 2008/0180908 A1 | 7/2008 | Wexler |
| 2008/0198549 A1 | 8/2008 | Rasmussen et al. |
| 2008/0229318 A1 | 9/2008 | Franke |
| 2008/0245083 A1 | 10/2008 | Tutunoglu et al. |
| 2009/0007591 A1 | 1/2009 | Bean et al. |
| 2009/0019875 A1 | 1/2009 | Fink et al. |
| 2009/0030554 A1 | 1/2009 | Bean, Jr. et al. |
| 2009/0121547 A1 | 5/2009 | Paik et al. |
| 2009/0138313 A1 | 5/2009 | Morgan et al. |
| 2009/0138888 A1 | 5/2009 | Shah et al. |
| 2009/0150123 A1 | 6/2009 | Archibald et al. |
| 2009/0223234 A1 | 9/2009 | Campbell et al. |
| 2009/0259343 A1 | 10/2009 | Rasmussen et al. |
| 2009/0276771 A1 | 11/2009 | Nickolov et al. |
| 2010/0057263 A1 | 3/2010 | Tutunoglu |
| 2010/0170663 A1 | 7/2010 | Bean, Jr. |
| 2010/0211669 A1 | 8/2010 | Dalgas et al. |
| 2010/0211810 A1 | 8/2010 | Zacho |
| 2010/0286956 A1 | 11/2010 | VanGilder et al. |

FOREIGN PATENT DOCUMENTS

| | | |
|---|---|---|
| DE | 102006041788 A1 | 3/2008 |
| EP | 0602911 A1 | 6/1994 |
| EP | 1610077 A2 | 12/2005 |
| EP | 1672300 A1 | 6/2006 |
| FR | 2624684 A1 | 6/1989 |
| FR | 2864854 A1 | 7/2005 |
| JP | 63-127042 A | 5/1988 |
| JP | 07-044275 A | 2/1995 |
| JP | 07269926 A | 10/1995 |
| JP | 09-298377 A | 11/1997 |
| JP | 2001-260640 A | 9/2001 |
| JP | 2002-101973 A | 4/2002 |
| JP | 2002-119339 A | 4/2002 |
| WO | 00/58673 A1 | 10/2000 |
| WO | 02/065030 A1 | 8/2002 |
| WO | 03005200 A1 | 1/2003 |
| WO | 03/083631 A1 | 10/2003 |
| WO | 03081406 A1 | 10/2003 |
| WO | 2005081091 A2 | 9/2005 |
| WO | 2005/122664 A1 | 12/2005 |
| WO | 2006/034718 A1 | 4/2006 |
| WO | 2006119248 A2 | 11/2006 |
| WO | 2006124240 A2 | 11/2006 |
| WO | 2007095144 A2 | 8/2007 |
| WO | 2008144375 A2 | 11/2008 |
| WO | 2009/014893 A1 | 1/2009 |

OTHER PUBLICATIONS

Abdlmonem H. Beitelmal et al.: "Thermo-Fluids Provisioning of a High Performance High Density Data Center" Distributed and Parallel Databases, Kluwer Academic Publishers, BO, vol. 21, No. 2-3, Apr. 22, 2006, pp. 227-238, XP019499843, ISSN: 1573-7578.
Abi-Zadeh, Davar et al., "A Transient Analysis of Environmental Conditions for a Mission Critical Facility after a Failure of Power", Arup Mission Criticial Facilities, Feb. 2001, pp. 1-12.
Ahmad, Jasim U. et al., "Navier-Stokes simulation of air-conditioning facility of a large modern computer room," Jun. 2005, Proceedings of the 2005 ASME Fluids Engineering Division Summer Meeting and Exhibition, pp. 1-6.
APC User's Guide Brochure, "InfraStruXure Manager," Mar. 2004, 181 pgs.
ASHRAE, "Thermal Guidelines for Data Processing Environments" 2004, Atlanta: American Society of Heating, Refrigerating, and Air-Conditioning Engineers, Inc., 2004, Atlanta.
Bash, C. E. et al.: "Balance of Power: Dynamic Thermal Management for Internet Data Centers", IEEE Internet Computing , Jan. 1, 2005, pp. 42-49, vol. 9, No. 1, IEEE Service Center, New York, NY.
Bash, C.E., Patel, C.D., and Sharma, R.K., "Efficient Thermal Management of Data Centers—Immediate and Long-Term Research Needs" Intl. J. Heat, Ventilating, Air-Conditioning and Refrigeration Research, 2003, pp. 137-152, vol. 9, No. 2.
Beitelmal et al., "Thermo-Fluids Provisioning of a High Performance High Density Data Center", Apr. 22, 2006, Springer Science and Business Media, Inc, Distributed and Parallel Databases, 21, pp. 227-238 DOI:1 0.1 007/s1 0619-005-0413-0.
Chandrakant D. Patel, et al., "Thermal Considerations in Cooling Large Scale High Copute Density Data Centers" IEEE 2002, pp. 767-776.
Dvinsky: "Hot Tips for Using Cooling Software a Little Planning Lets Users Get More from Their Thermal-Simulation Software", Machine Design, Penton Media, Cleveland, OH, vol. 72, No. 4, Feb. 24, 2000.
Ehsan Pakabaznia et al., "Miminizing data center cooling and server power costs", Proceedings of the 14th ACM/IEEE International Symposium on Low Power Electronics and Design, ISLPED '09, Jan. 1, 2009 (Jan. 1, 2009), p. 145, XP55015368, New York, New York, USA, DOI: 10.1145/1594233.1594268, ISBN: 978-1-60-558684-7.
Herrlin, M.K., "Rack Cooling Effectiveness in Data Centers and Telecom Central Offices: The Rack Cooling Index (RCI)," ASHRAE Transaction, 2005, pp. 725-731, vol. 111(2).
Innovative Research, Inc., http://web.archive.org/web/20051221005029/http://www.inres.com/, Dec. 21, 2005, published on World Wide Web.
International Search Report and Written Opinion from corresponding International Application No. PCT/2010/022074, dated Jul. 27, 2010.
International Search Report and Written Opinion from corresponding International Application No. PCT/US2011/052561, dated Dec. 27, 2011.
International Search Report for PCT/US2006/16739 mailed Oct. 3, 2006.
International Search Report for PCT/US2008/051908 mailed Jul. 3, 2008.
International Search Report for PCT/US2009/065700 mailed Feb. 18, 2010.
International Search Report for PCT/US2010/023142, mailed May 11, 2010.
International Search Report for PCT/US2010/033867 mailed Jul. 7, 2010.
International Search Report for PCT/US2010/033876 mailed Jul. 1, 2010.
International Search Report for PCT/US2010/035089 mailed Jul. 26, 2010.
International Search Report for PCT/US2011/051866 mailed Feb. 24, 2012.
International Search Report for PCT/US2011/067332 mailed Jun. 8, 2012.
Jeffrey Rambo et al., "Modeling of data center airflow and heat transfer: State of the art and future trends", Distributed and Parallel Databases, Kluwer Academic Publishers, BO, vol. 21, No. 2-3, Jan. 20, 2007 (Jan. 20, 2007), pp. 193-225, XP019499845, ISSN: 1573-7578, DOI:10.1007/S10619-006-7007-3.
K. Dunlap, "Cooling Audit for Identifying Potential Cooling Problems in Data Centers", White Paper #40, pp. 1-18, American Power Conversion, May 20, 2004, published on World Wide Web.
Modern Refrigeration and Air Conditioning (18th Edition) Althouse et al. Published by The Goodheart-Willcox Company, Inc. (c)2000.
N. Rasmussen, "Calculating Total Cooling Requirements for Data Centers", White Paper #25, pp. 1-8, American Power Conversion, May 20, 2004, published on World Wide Web.
N. Rasmussen, "Cooling Strategies for Ultra-High Density Racks and Blade Servers", White Paper #46, pp. 1-22, American Power Conversion, Mar. 29, 2005, published on World Wide Web.
N. Rasmussen, "Strategies for Deploying Blade Servers in Existing Data Centers", White Paper #125, pp. 1-14, American Power Conversion, Mar. 29, 2005, published on World Wide Web.

(56) References Cited

OTHER PUBLICATIONS

Pinheiro, Eduardo, "Load Balancing and Unbalancing for Power and Performance in Cluster-Based Systems," Internet Citation, May 1, 2001 URL:http://research.ac.upc.es/pact01/colp/paper04.pdf, retrieved on Nov. 17, 2003.

Rittal, <http://www.rittal.com/services_support/downloads/brochures.asp>, download page for catalogue 31.

Rittal, Catalogue 31, front page p.672 and back page, Apr. 2005.

Sharma, R.K, Bash, C.E., and Patel, C.D, "Dimensionless Parameters for Evaluation of Thermal Design and Performance of Large-Scale Data Centers." 8th ASME/AIAA Joint Thermophysics and Heat Transfer Conference, Jun. 24-26, 2002. St. Louis, Missouri.

Shrivastava S K et al., Optimization of Cluster Cooling Performance for Data Centers, Thermal and Thermomechanical Phenomena in Electronic Systems, May 28, 2008, pp. 1161-1166, 11th Intersociety Conference on, IEEE, Piscataway, NJ.

Thermodynamics: An Engineering Approach (Fourth Edition) Cengel et al. Published by McGraw Hill (c)2004.

Vangilder et al., "Airflow Uniformity thourhg Perforated Tiles in a Raised-Floor Data Center", White Paper 121, Jul. 17-22, 2005, 10 pages.

Vangilder, James W. et al., "Caputure index: an airflow-based rack cooling performance metric," 2007, ASHRAE Transactions, vol. 113, pp. 126-136.

Vangilder, James W. et al., "Real-Time prediction of rack-cooling performance," 2006, ASHRAE Transactions, vol. 112, pp. 151-162.

"Enthalpy" Published by the National Aeronautics and Space Administration and editted by Tom Benson. Retrieved on Jul. 13, 2009 from http://www.grc.nasa.gov/WWW/K-12/airplane/enthalpy.html.

Le et al., "Operating Behaviour of Single Split Coil Systems Under Modulating and Two-Position Control" Published 2005 by American Society of Heating, Refrigerating and Air-Conditioning Engineers, Inc.

"Essential Cooling System Requirements for Next Generation Data Centers," White Paper #5, Revision 3, 2003 American Power Conversion, Rev 2002-3, pp. 1-10.

Neil Rasmussen, "Avoidable Mistakes that Compromise Cooling Performance in Data Centers and Network Rooms," White Paper #49, 2003 American Power Conversion, Rev 2003-0, pp. 1-15.

Neil Rasmussen, "Cooling Options for Rack Equipment with Side-to-Side Airflow," White Paper #50, 2004 American Power Conversion, Rev 2004-0, pp. 1-14.

Neil Rasmussen, "Air Distribution Architecture Options for Mission Critical Facilities," White Paper #55, Revision 1, 2003 American Power Conversion, Rev 2003-0, pp. 1-13.

"How and Why Mission-Critical Cooling Systems Differ From Common Air Conditions," White Paper #56, Revision 2, 2003 American Power Conversion, Rev 2003-2, pp. 1-13.

Tony Evans, "Fundamental Principles of Air Conditioners for Information Technology," White Paper #57, Revision 1, 2004 American Power Conversion, Rev 2004-1, pp. 1-9.

Tony Evans, "Humidification Strategies for Data Centers and Network Rooms," White Paper 58, 2004 American Power Conversion, Rev 2004-0, pp. 1-13.

Tony Evans, "The Different Types of Air Conditioning Equipment for IT Environments," White Paper #59, 2004 American Power Conversion, Rev 2004-0, pp. 1-21.

Neil Rasmussen, "Guidelines for Specification of Data Center Power Density," White Paper #120, 2005 American Power Conversion, Rev 2005-0, pp. 1-21.

International Search Report for PCT/US2006/037772 mailed Jul. 10, 2007.

Althouse, Turnquist, Bracciano: "Modern Refrigeration and Air Conditioning," 2000, The Goodheart-Willcox Company, Inc., XP002479591, pp. 715-716.

Rittal Catalogue, Aug. 2005, p. 115 and p. 140.

International Search Report for PCT/US07/01109 mailed Mar. 28, 2008.

International Search Report for PCT/US2007/087928 mailed Jul. 29, 2008.

International Search Report for PCT/US2007/087910 mailed Apr. 15, 2009.

International Search Report for PCT/US2009/043400 mailed Nov. 23, 2009.

* cited by examiner

METHOD AND APPARATUS FOR COOLING

CROSS-REFERENCE TO RELATED APPLICATIONS

This application is a continuation-in-part of, and claims priority under 35 U.S.C. §120 to, U.S. patent application Ser. No. 12/137,177 filed on Jun. 11, 2008 which in turn is a continuation-in-part of, and claims priority under 35 U.S.C. §120 to, U.S. patent application Ser. No. 11/504,370 filed Aug. 15, 2006. Each of these applications is hereby incorporated herein by reference in its entirety for all purposes.

BACKGROUND OF THE DISCLOSURE

1. Field of Disclosure

Embodiments may relate generally to devices and methods for cooling a room, such as a data center, equipment room or wiring closet. More specifically, aspects of the present disclosure may relate to cooling systems and methods used to cool equipment housed by racks and enclosures.

2. Discussion of Related Art

Over the years, a number of different standards have been developed to enable equipment manufacturers to design rack mountable components that can be mounted in standard racks offered by different producers. An exemplary industry standard is commonly referred to as a "nineteen inch" rack, used extensively in data centers and other large facilities. With the proliferation of information technology, it is not uncommon for a data center to contain hundreds of these racks. Further, with the ever decreasing size of computer equipment, and in particular, computer servers and blades, the number of electrical devices mounted in each rack has been increasing, raising concerns about adequately cooling the equipment.

Previously, in certain configurations, data centers have been cooled by computer room air conditioner ("CRAC") units that are typically hard piped, immobile units positioned around the periphery of the data center room. These CRAC units intake air from the fronts of the units and output cooler air upwardly toward the ceiling of the data center room. In other embodiments, the CRAC units intake air from near the ceiling of the data center room and discharge cooler air under a raised floor for delivery to the fronts of the equipment racks. The rack-mounted equipment typically cools itself by drawing air along a front side or air inlet side of a rack, drawing the air through its components, and subsequently exhausting the air from a rear or vent side of the rack. A disadvantage of the CRAC-type air conditioning system is that cool air is mixed with the room temperature air, which is inefficient.

Heat produced by rack-mounted equipment can have adverse effects on the performance, reliability and useful life of the equipment components. In particular, rack-mounted equipment, housed within an enclosure, may be vulnerable to heat build-up and hot spots produced within the confines of the enclosure during operation. Airflow requirements can vary considerably as a result of different numbers and types of rack-mounted components and different configurations of racks and enclosures. Users of electronic equipment may add, remove, and rearrange rack-mounted components as their needs change and new needs develop. Furthermore, the amount of heat generated by a rack of equipment is dependent on the amount of electrical power drawn by equipment in the rack during operation. Cooling requirements may therefore vary over time.

SUMMARY

Aspects relate generally to systems and methods for equipment cooling.

In accordance with one or more embodiments, a method of improving efficiency of a cooling unit, comprising detecting a degree of opening of a hot gas bypass valve configured to divert a portion of coolant from a compressor to a heat exchanger of the cooling unit, and adjusting a discharge pressure set point based on the detected degree of opening.

In some embodiments, the discharge pressure set point may be adjusted in response to the detected degree of opening exceeding a threshold value. The discharge pressure set point may be reduced in response to the degree of opening exceeding the threshold value. Adjusting the discharge pressure set point may comprise correlating the discharge pressure set point to the detected degree of opening. In at least one embodiment, the method may further comprise adjusting the degree of opening of the hot gas bypass valve in response to a change in cooling demand.

In accordance with one or more embodiments, a method of controlling a cooling unit may comprise establishing a first discharge pressure set point under a nominal cooling load, at least partially opening a hot gas bypass valve of the cooling unit in response to a reduced cooling load and establishing a second discharge pressure set point under the reduced cooling load in response to the hot gas bypass valve being opened beyond a threshold percentage.

In some embodiments, the second discharge pressure set point is lower than the first condenser discharge pressure. The method may further include a step of introducing cooling medium to the cooling unit at a minimum condenser inlet temperature of 45° F.

In accordance with one or more embodiments, a cooling unit may comprise a compressor to provide coolant under pressure, a condenser in fluid communication with the compressor; an evaporator in fluid communication with the condenser and the compressor, a hot gas bypass valve, in fluid communication with the compressor and the evaporator, configured to divert a portion of coolant from the compressor to the evaporator under reduced cooling loads, and a controller configured to detect a position of the hot gas bypass valve and to adjust a discharge pressure set point in response to the detected position of the hot gas bypass valve. In some embodiments, the controller may be configured to adjust the discharge pressure set point in response to the hot gas bypass valve being opened beyond a threshold percentage. In at least one embodiment, the cooling unit may further comprise a source of condenser cooling medium at below 55° F. fluidly connected to the condenser in water cooled units.

In accordance with one or more embodiments, a cooling unit having a first mode of operation under nominal cooling loads and a second mode of operation under reduced cooling loads is disclosed. The cooling unit may comprise a compressor to provide coolant under pressure, a condenser in fluid communication with the compressor, an evaporator in fluid communication with the condenser and the compressor, a hot gas bypass valve, in fluid communication with the compressor and the evaporator, configured to divert a portion of coolant from the compressor to the evaporator under reduced cooling loads, and a controller configured to close the hot gas bypass valve and to establish a default discharge pressure set point during the first mode of operation, and further configured to at least partially open the hot gas bypass valve and to establish a second discharge pressure set point during the second mode of operation.

In some embodiments, the hot gas bypass valve is opened to at least a predetermined percentage during the second mode of operation. In at least one embodiment, the second discharge pressure set point is correlated to an amount by which the hot gas bypass valve is opened.

In accordance with one or more embodiments, a method of controlling a cooling unit may comprise establishing a first discharge pressure set point, at least partially opening a hot gas bypass valve of the cooling unit in response to a reduced cooling load, detecting a refrigerant pressure fluctuation and establishing a second discharge pressure set point in response to the refrigerant pressure fluctuation detected.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF DRAWINGS

Various aspects of at least one embodiment are presented in the accompanying drawings.

The drawings are provided for the purposes of illustration and explanation and are not intended as a definition of the limits of the disclosure. The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
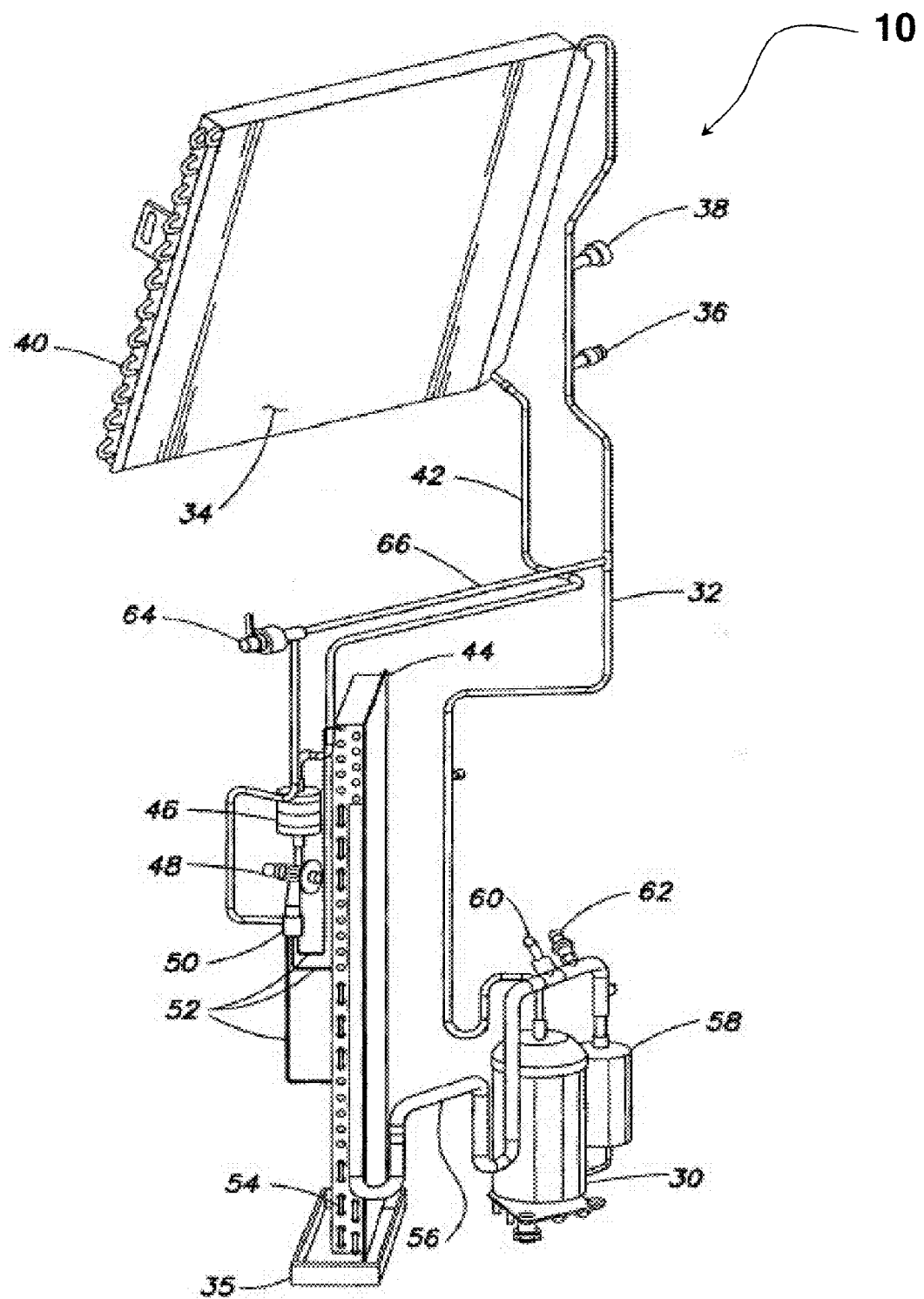
FIG. 1a is a perspective view of components of an air-cooled cooling unit in accordance with one or more embodiments.

One or more embodiments may generally provide systems and methods for enhancing the efficiency of cooling units at partial cooling or IT loads. In some embodiments, fluctuations in refrigerant pressure at lower cooling capacities may be avoided. Refrigerant fluctuations may occur when an electronic hot gas bypass vale is widely open, and when the temperature of entering condenser water or water/glycol mixture is low. Fluctuations in refrigerant pressure at lower entering condenser water temperatures may be eliminated in accordance with one or more embodiments. In at least one embodiment, the minimum condenser water inlet temperature may be reduced.

This disclosure is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

At least one embodiment of the present disclosure is directed to a modular cooling system that is selectively configurable to cool electronic equipment housed within equipment enclosures or racks of a data center. One or more embodiments may be implemented in cooling systems and methods such as those described in U.S. patent application Ser. No. 11/504,370 entitled METHOD AND APPARATUS FOR COOLING to Tutunoglu et al., which is hereby incorporated herein by reference in its entirety for all purposes.

As used herein, "enclosures" and "racks" are used to describe apparatus designed to support electronic equipment. Such a cooling system is capable of employing one or more cooling units on an as needed basis to provide localized cooling within the data center. Specifically, multiple cooling units may be interspersed in a row of equipment racks to more efficiently cool the data center. The circulation path of warm air generated by the electronic equipment is greatly reduced, thereby nearly eliminating the mixing of hot and cold air within the data center.

Data centers are typically large rooms designed, in certain instances, to house hundreds of electronic equipment racks arranged in rows within the data center. The rows of equipment racks are arranged in such a manner that there are cold aisles and hot aisles. The cold aisles typically provide access to the fronts of the enclosures where the electronic equipment is accessed. The hot aisles typically provide access to the backs of the equipment racks. As requirements change, the number of equipment racks may be increased or decreased depending on the functional requirements of the data center. At least one embodiment of the cooling system is modular and scalable, and may take the form of a kit designed to meet these changing needs. Also, although relatively large data centers are discussed as an intended use for such a cooling system, as mentioned above, the system of the present disclosure is scalable and may be employed in smaller rooms on a smaller scale and for applications other than data center.

In accordance with one or more embodiments, a cooling system may comprise air-cooled units or water-cooled units. In one embodiment, the cooling system may comprise a plurality of cooling units, each cooling unit having a housing adapted to support components of the cooling system. For example, the components of the cooling unit may include first and second heat exchangers coupled to a conduit system configured to deliver coolant to the heat exchangers. Fans may be provided to move air across the heat exchangers in some embodiments pertaining to air-cooled units in which the condenser uses air to condense refrigerant. In some embodiments pertaining to water-cooled units, a condenser may use water or a water/glycol mixture to facilitate refrigerant condensation. The cooling unit may be disposed within a row of equipment racks and configured to intake the hot air within the data center from a hot aisle, for example, to cool the air to slightly below ambient temperature. This configuration eliminates the inefficiency of mixing hot air with the room temperature air to obtain a warm air mixture. This configuration may also decrease the latent cooling provided by the data center's air conditioning system thereby decreasing the need for humidification. The modular nature of the cooling unit allows the user to optimize the location of each cooling unit since each cooling unit includes the ability to sense and display the capacity of the system, the flow rate, coolant and air inlet and outlet temperatures, and pressure differentials obtained from pressure readings taken throughout the cooling unit. Thus, the cooling unit may be employed and redeployed for maximum efficiency and optimal use within the data center.

As discussed above, data centers are typically configured with rows of equipment racks arranged such that cool air is drawn into the racks from a cold aisle and warm or hot air is exhausted from the racks into a hot aisle. The equipment racks may be arranged in two rows with the fronts of the equipment racks in a near row being arranged in a forward direction and the backs of the equipment racks in a far row being arranged in a rearward direction. However, as stated above, in a typical data center, there are multiple rows of equipment racks. The rows may be arranged with the fronts of the equipment racks facing one another to define the cold aisle and with the backs of the equipment racks facing one another to define the hot aisle. In one embodiment, one or more cooling units may be positioned so that the backs of the cooling units are adjacent a hot aisle. Depending on the cooling requirements of the data center, more than one cooling unit may be provided to cool warm air deposited in the hot aisle by the equipment enclosures.

In order to address the heat build-up and hot spots within the data center, and to address climate control issues within the data center in general, a modular cooling unit is provided in one embodiment. As discussed above, due to cooling requirements within the data center or room, a plurality of cooling units may be provided. In one embodiment, the arrangement is such that there is a cooling unit for every two equipment racks provided in the data center. However, it should be understood that a person of ordinary skill in the art, given the benefit of this disclosure, may provide more or less cooling units within the data center based on environmental conditions of the data center. Further in some embodiments, the concentration and locations of cooling units may be adjusted based on the locations of the hottest racks in the data center, or based on information obtained and analyzed by a data center information management system. Additionally, cooling units of embodiments of the disclosure may be used in combination with other types of cooling systems, such as cooling systems of the types disclosed in U.S. patent application Ser. Nos. 11/335,874, 11/335,856 and 11/335,901, each entitled COOLING SYSTEM AND METHOD, which are owned by the assignee of the present disclosure and which are hereby incorporated herein by reference in their entireties for all purposes.

In accordance with one or more embodiments, an air-cooling unit may be configured to have two sections or modules, which together define a closed loop cooling system that may be configured within a data center, equipment room or wiring closet to cool electrical components housed by equipment storage racks. In one embodiment, a lower module of the cooling unit includes a set of evaporator fans that are configured to draw heated air taken from a "hot" aisle, for example, which is generated by the electrical components. This heated air is drawn through an evaporator having a coil containing a coolant medium (e.g., a refrigerant) to cool the air. The arrangement is such that warm air drawn into the lower module by the evaporator fans flows over the evaporator to cool the air. The cooled air is forced back into the environment through a front of the cooling unit. Based on cooling requirements, other airflow patterns may be provided.

The heat absorbed by the coolant contained in the coil of the evaporator is transported to an upper module, which rests on the lower module. This upper module has a condenser adapted to cool the heated coolant delivered to the upper module from the lower module. In addition to the condenser, the upper module includes a set of condenser fans and a first plenum that is in fluid communication with an opening formed in a top of the upper module to draw relatively cooler air into the upper module. A second plenum takes air directed by the first plenum to the set of condenser fans, which directs the air over the condenser. The relatively cooler air is heated as it flows over the condenser. Once heated, the air flows through one of two openings formed in the top of the upper module. The liquid coolant is directed back to the evaporator, where the cycle begins again. A compressor, such as a rotary compressor, pumps evaporated coolant from the evaporator to the condenser. The compressor, evaporator fans and condenser fans may all be controlled by a controller. In one embodiment, to improve capacity control and efficiency, warmer coolant being delivered by the compressor unit to the condenser may be diverted to the evaporator by a bypass valve.

It should be understood that, in embodiments of the disclosure, the lower module may be configured to perform the condensing function described above and the lower module may be configured to perform the evaporating function described above.

Another cooling unit of embodiments of the disclosure may be configured to have an evaporator heat exchanger and water or water/glycol mixture cooled condenser heat exchanger. A 3-way water regulation valve may control the amount of condenser water entering condenser to regulate refrigerant discharge pressure at refrigerant discharge pressure set point.

In one embodiment, a controller is adapted to control the operation of the cooling system based on environmental parameters obtained by the controller. Generally speaking with prior cooling systems, the individual cooling units can not communicate with one another. For example, the controller may embody a plurality of controllers provided in the cooling units that communicate with one another over a controller area network (CAN) Bus. In other embodiments, a master controller may be provided to control the operation of the controllers of the cooling units. Each cooling unit may be provided with a display, which is operably coupled to the controller. The display is adapted to display the environmental conditions of the data room, such as, and not limited to, the temperature and the humidity of the data center at the cooling unit, the temperature of the air entering into and exiting out of the cooling unit, the temperature of coolant entering into and exiting out of the cooling unit, the flow rate of coolant entering the cooling unit, and the cooling capacity of the cooling unit. Suitable monitors and/or gauges may be provided to acquire such information. Alternatively, or in addition to the foregoing embodiment, the environmental conditions may be displayed on a unit provided with an integrated data center control and monitoring system.

Any coolant medium may flow through the working components of the cooling unit such as a fluid cooled condenser. Coolant describes all types of medium used to cool. In one or more embodiments, the condenser may be cooled with a fluid. The fluid may be a liquid or a gas. In some non-limiting embodiments, the condenser may be cooled with a liquid coolant, such as water or water/glycol mixture coolant. Various refrigerants including R134A, R22, R407A, R407C and R410A are commonly known in the art and may also be implemented to cool the condenser. In other embodiments, gaseous coolants, such as air, may be used to cool the condenser. Various fluid cooled condensers may therefore be implemented.

Referring now to FIG. 1a, the internal components of a cooling unit 10 are illustrated. The components of an exemplary cooling unit 10 are suitably secured to and contained within a housing of the cooling unit. As shown, a compressor 30 is provided for delivering hot gas coolant under pressure to the components of the cooling unit 10. The pressurized coolant travels through a discharge pipe 32, which connects the compressor 30 to a condenser 34. A temperature sensor (not shown) and a first pressure transducer 36 may be provided adjacent to the condenser 34 to measure the temperature and the pressure of the coolant as it enters the condenser. The purpose of the temperature sensor and the pressure transducer 36 will be discussed in greater detail below. A high pressure switch 38 may be further provided to de-energize the compressor thereby stopping the delivery of coolant to the condenser should the coolant experience an out of tolerance pressure condition that requires power to the compressor to be cut off. The condenser 34 includes a coil 40 having thermally conductive fins (not shown) configured to cool the heated coolant within the coil of the condenser. Once the coolant is cooled within the condenser 34 (e.g., transitioning the coolant from an evaporated state to a condensed state), the coolant travels through another liquid pipe 42 to an evaporator 44. Prior to entering the evaporator 44, the coolant first travels through a filter drier 46 to eliminate impurities and to remove unwanted non-condensables within the coolant. Once through the filter drier 46, the coolant travels through a thermal expansion valve 48 to condition the coolant prior to entering the evaporator 44.

Next, the low pressure coolant enters a distributor 50 and is distributed to the evaporator 44 by one of several (e.g., three) conduits, each indicated at 52 in FIG. 1a. As shown, one conduit 52 delivers coolant to the evaporator 44 near the top of the evaporator. A second conduit 52 delivers coolant to a middle of the evaporator 44. And finally, a third conduit 52 delivers coolant to a bottom of the evaporator 44. This configuration ensures that coolant is evenly distributed to the evaporator 44, which is designed to include a coil 54 in thermal communication with metal fins (not shown) so that heat may be absorbed from relatively warm air flowing over the evaporator. Once heated by warm air passing over the evaporator 44, the evaporated coolant travels back to the compressor 30 via a section of suction piping 56. However, prior to entering the compressor 30, the coolant passes through a compressor suction accumulator 58, which ensures that coolant enters into the compressor 30 in an evaporated state. Another temperature sensor 60 and another pressure transducer 62 may be provided adjacent to the compressor 30, the purpose of which will be discussed in greater detail below. A condensate pan 35 may be disposed below the evaporator 44 to collect condensate generated by the evaporator.

The arrangement is such that high temperature refrigerant flows from the compressor 30 to the condenser 34. Pressure and temperature readings of the coolant are taken prior to the coolant entering the condenser 34. The condenser 34 cools the coolant by virtue of relatively cool air passing over the condenser coil 40. Once cooled, the coolant travels to the evaporator 44. A bypass valve 64 may be provided to divert coolant normally directed to the condenser 34 from the compressor 30 to the evaporator 44 via a discharge pipe 66. By opening the bypass valve 64 by means of a stepper motor provided with the bypass valve, for example, a portion of coolant traveling to the condenser is diverted to the evaporator by way of distributor 50. The operation of the bypass valve 64, which may sometimes be referred to as a hot gas bypass valve, may be manipulated to regulate the capacity of the cooling unit 10. As will be discussed in greater detail below, by closely monitoring the pressure and/or temperature of the coolant entering into the condenser 34, the efficiency of the cooling unit 10 may be optimized by bypassing coolant that travels from the condenser to the evaporator. In one embodiment, the compressor may embody a rotary compressor, such as a rotary compressor offered by Hitachi (China).

Figure 1B:
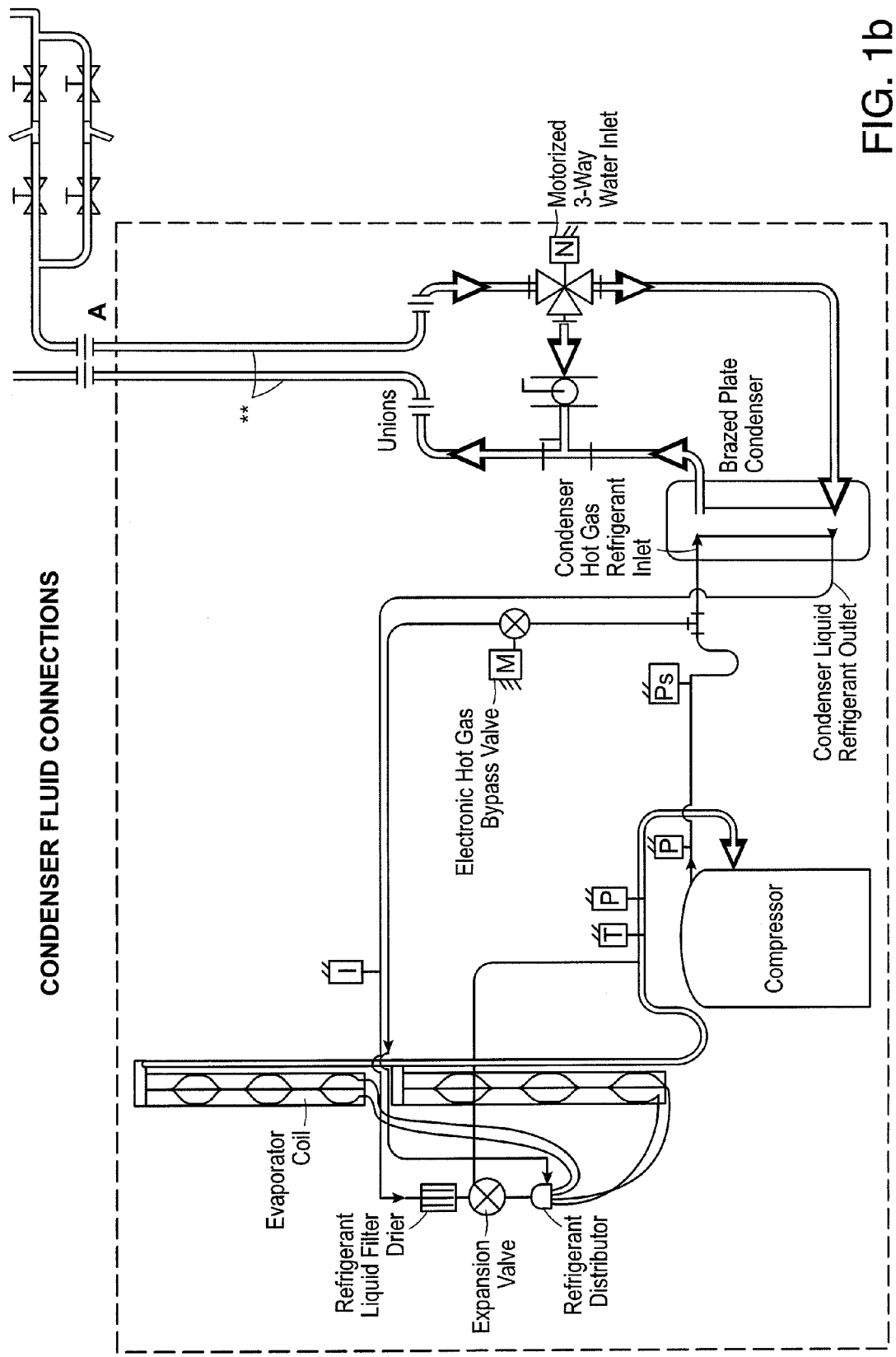
FIG. 1b is a perspective view of components of a water-cooled cooling unit in accordance with one or more embodiments.

FIG. 1b presents a water-cooled cooling system. In water cooled air conditioning units a brazed plate condenser may be used instead of fin and tube heat exchanger as a condenser. Water or water/glycol mixture medium is used to cool and condense hot gas refrigerant entering condenser. Refrigerant discharge pressure is measured by a pressure transducer on a discharge pipe at a compressor outlet. A controller uses a measured pressure value and regulates an opening of a three-way water regulation valve on the condenser water loop to regulate water or water/glycol mixture flow rate entering the condenser. Discharge pressure can be kept at a discharge pressure set point or several set points for different applications or scenarios by regulating the condenser water or water/glycol mixture flow rate.

In one embodiment, a controller may be operably coupled to a display unit, such as a display unit shown and disclosed in U.S. patent application Ser. Nos. 11/335,874, 11/335,856 and 11/335,901 discussed above. In a certain embodiment, the display unit is mounted on the front of the cooling unit 10 and has a liquid crystal display, for example, to display certain environmental conditions, such as temperature and humidity of the data center, the temperature of air entering into and exiting out of the cooling unit, the temperature and pressure of coolant entering into and exiting out of the evaporator and condenser of the cooling unit, and the flow rate of coolant within the cooling unit. A plurality of control buttons and status indicators are further provided on the display unit to enable the operator to manipulate the operation of the cooling system and to quickly determine the status of a certain condition, respectively.

The controller may be configured to control the operation of the cooling unit 10 as well as provide communication with external devices. In one embodiment, the controller may be a separately dedicated unit that controls the operation of multiple cooling units 10. In another embodiment, the controller may be provided in one of the cooling units 10, with the cooling unit having the controller functioning as the main cooling unit and the other cooling units functioning as subservient cooling units. In yet another embodiment, the operation of the cooling unit 10 may be operated under the control of an integrated data center control and monitoring system with each cooling unit having a controller unit that communicates with the other cooling units over the network. In one such embodiment, the controller may communicate with a data center control system to provide status of the components of the cooling system and to receive control commands for the data center control system. In one particular embodiment, each cooling unit 10 includes a controller that communicates with the data center controller over a network, such as a CAN Bus network, and in one such embodiment, the data center controller may be implemented using the integrated data center control and monitoring system, such as the InfraStruXure™ data center manager sold by American Power Conversion Corporation of West Kingston, R.I., the assignee of the present disclosure. Notwithstanding the particular configuration, the controller is adapted to control the flow of coolant from the compressor 30 to the condenser 34 and the evaporator 44 depending on the temperature and pressure readings of the cooling unit.

Figure 2:
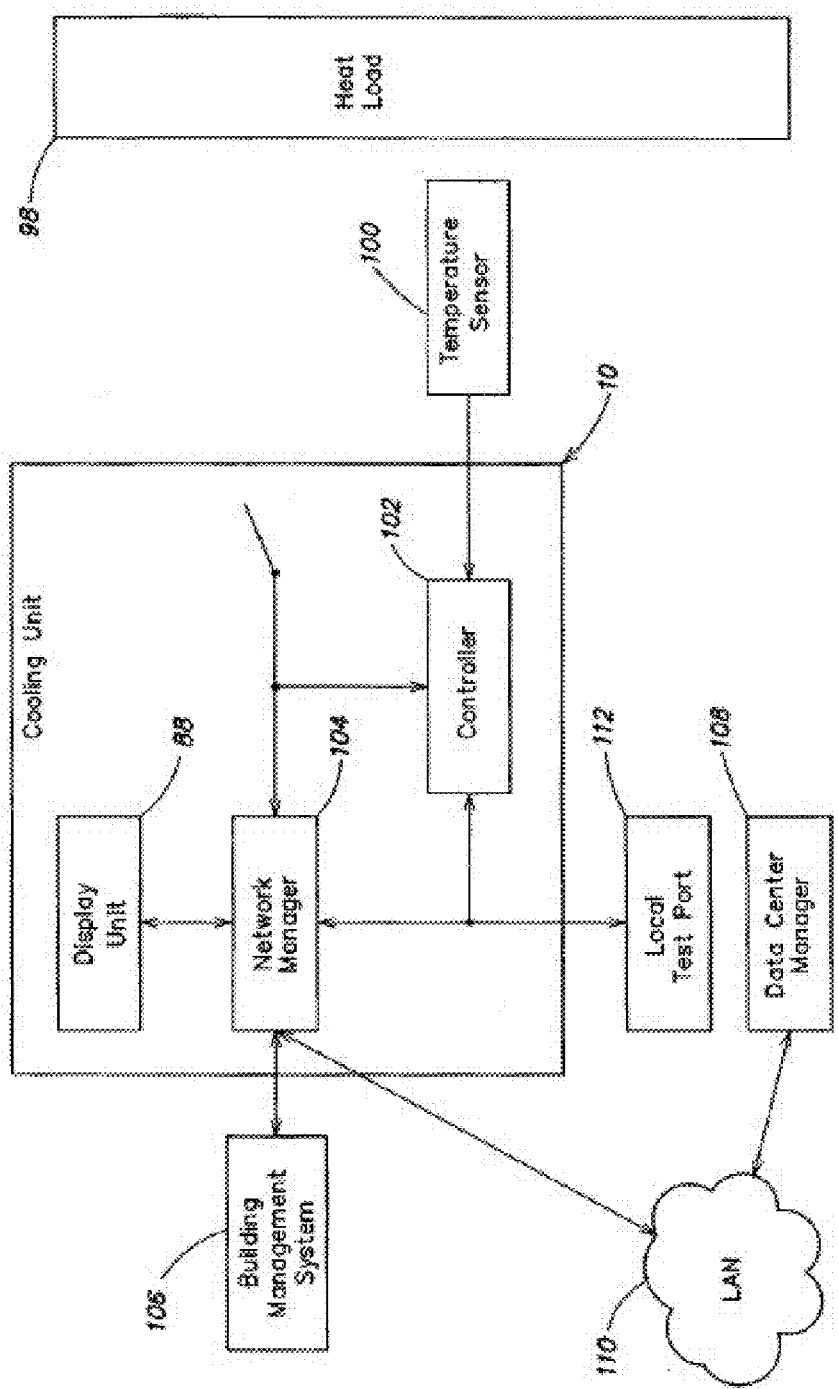
FIG. 2 is a system block diagram of the cooling unit according to one or more embodiments.

FIG. 2 illustrates a system block diagram of the cooling unit 10, showing the major interfaces between the cooling unit and potential external devices. As shown, a heat load 98 is applied to the cooling unit 10 in which a temperature sensor 100 detects and transmits a signal to an embedded controller 102 of the cooling unit. As shown, the embedded controller 102 may communicate with a network manager 104 by means of a CAN, for example. The network manager 104 may communicate with the display unit 88, a building management system 106, if provided, a data center manager 108 by means of a local area network 110 (LAN), for example, or a local test port 112. In a certain embodiment, the network manager may employ a network management card, a real time clock and a CAN controller.

Figure 3:
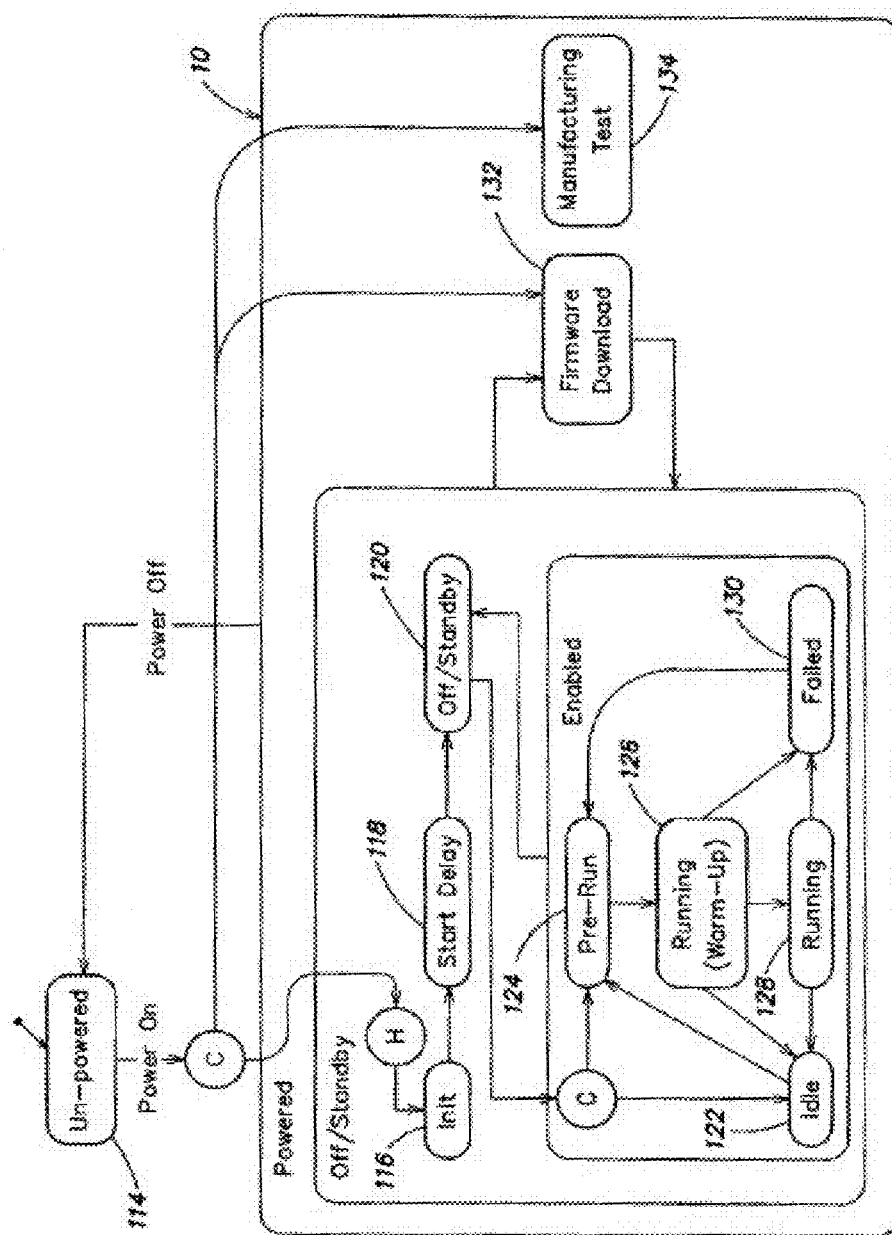
FIG. 3 is a system block diagram of the operational states and modes of a cooling unit in accordance with one or more embodiments.

During operation, the cooling unit 10 may be configured to function between several states, including, but not limited to, a main operational state, a condensate state and a hot gas bypass valve state. In the main operational state, which is illustrated in FIG. 3, the operation of the cooling unit proceeds as follows: (a) un-powered; (b) start-up delay; (c) off/standby; (d) idle operation; (e) failed operation; (f) warm-up operation; (g) running operation; (h) firmware download; and (i) test. Specifically, once power is provided, the cooling unit operationally moves from an un-powered condition at 114 to an initial powered condition at 116 in which initialized state variables are set. Once initialized, the cooling unit moves to a start-up delay condition at 118 in which no action is taken. After a predetermined time period (as determined by a delay timer, for example) and the synchronization of a stepper motor, the cooling unit transitions to an off/standby condition at 120 in which the hot gas bypass valve is fully opened. In this condition, the temperature and discharge pressure threshold alarms are disabled (except when employing a rack containment system, wherein only the temperature threshold alarms are disabled) and the fan speeds (evaporator and condenser) are set to idle (except when employing a rack containment system or when the machine is in proportional spot configuration mode wherein the fans are kept running at a minimum speed). In the off/standby mode 120, the cooling unit 10 is ready for operation.

As shown, the mode of operation may transition from either the off/standby condition 120 or an idle operation mode 122 to a pre-run operation mode at 124. The transition occurs if all of the following conditions are met: (1) the delay timer is not running; (2) the device has been commanded upon by the controller; (3) the suction and discharge pressures are equalized; (4) there is no idle requested due to a leak; and (5) the cooling unit inlet temperature, when employing in-row or air containment configurations, or return air temperature, when employing a spot cooling configuration, exceeds a predetermined cool set point and a dead band (i.e., a tolerance that prevents the unwanted transition to back to off/standby or idle modes). The transition to pre-run operation mode 124 may also occur when the forgoing transition does not occur, and the device has been commanded upon the controller. When in idle operation mode 122, the transition may also occur when (1) the delay timer is not running, (2) the suction pressure is above a predetermined threshold, e.g., 92 psig, (3) the condensate pan is not full, (4) there is no idle requested due to a leak, (5) the line pressure has equalized, and (6) the cooling unit inlet temperature (for in-row or containment configurations) or return air temperature (for spot cooling configurations) exceeds the predetermined cool set point and dead band.

During pre-run mode 124, the hot gas bypass valve is fully closed to clear any events that are no longer active. The temperature and discharge pressure threshold alarms are enabled and the evaporator and condenser fans are operated at full (maximum) speed. A delay timer is set for a predetermined time period, e.g., twenty seconds. When warming up at 126, the cooling unit is providing environmental control functionality in which the compressor is running. In this state, the evaporator and condenser fans are run at full (maximum) speed and the bypass valve is closed to allow the system to warm up and stabilize prior to attempting to control the system. Once warmed up, the cooling unit may be operated at 128 to provide the cooling operation described above. If failure occurs, which is indicated at 130, at either at the pre-run 124, warm-up 126 or running 128 modes, the pre-run routine 124 may be started again. The cooling unit may be further configured to conduct firmware download operations at 132 and manufacturing testing at 134, either during operation, or while powering up.

Transition to idle mode 122 may occur when upon one of the following events: (1) the condensate pan is full; (2) if there is an idle requested due to leak; (3) when employing a spot cooling configuration, the return air temperature is less than or equal to the cool set point; (4) when employing an in-row or containment system configurations, the cooling unit inlet temperature is below a cool set point, e.g., 90° F.-sec; (5) if high head pressure input is asserted (and not the third such event in thirty minutes); or (6) suction pressure is below a predetermined threshold, e.g., 92 psig (and not the third such event in thirty minutes). Transition from either warm-up mode 126 or running mode 128 to failure mode 130 may occur when the cooling unit is commanded upon by the controller and an analog sensor has failed, or there were three high head pressure events in thirty minutes, for example, or there were three low suction pressure events in thirty minutes, for example.

In one embodiment, transition from failure mode 130 to pre-run mode 124 may occur when all of the following conditions are met: (1) the cooling unit is commanded upon by the controller; (2) the delay timer is not running; (3) the condensate pan is not full; (4) no analog sensors have failed; (5) the three high head pressure in thirty minutes event is cleared, for example; and (6) the three low suction pressure in thirty minutes event is clear, for example. Transition back to off/standby mode 120 may occur when the unit is commanded upon by the controller. Transition from warm-up mode 126 to idle mode 122 may occur upon one of the following events: (1) if the condensate pan is full; (2) there is an idle requested due to leak; (3) when in discrete mode, the return air temperature is less than or equal to the cool set point, or, when in proportional mode, the rack inlet temperature is below the cool set point for 90° F.-sec, for example; or (4) if the high head pressure input is asserted and it is not the third such event in thirty minutes.

Figure 4:
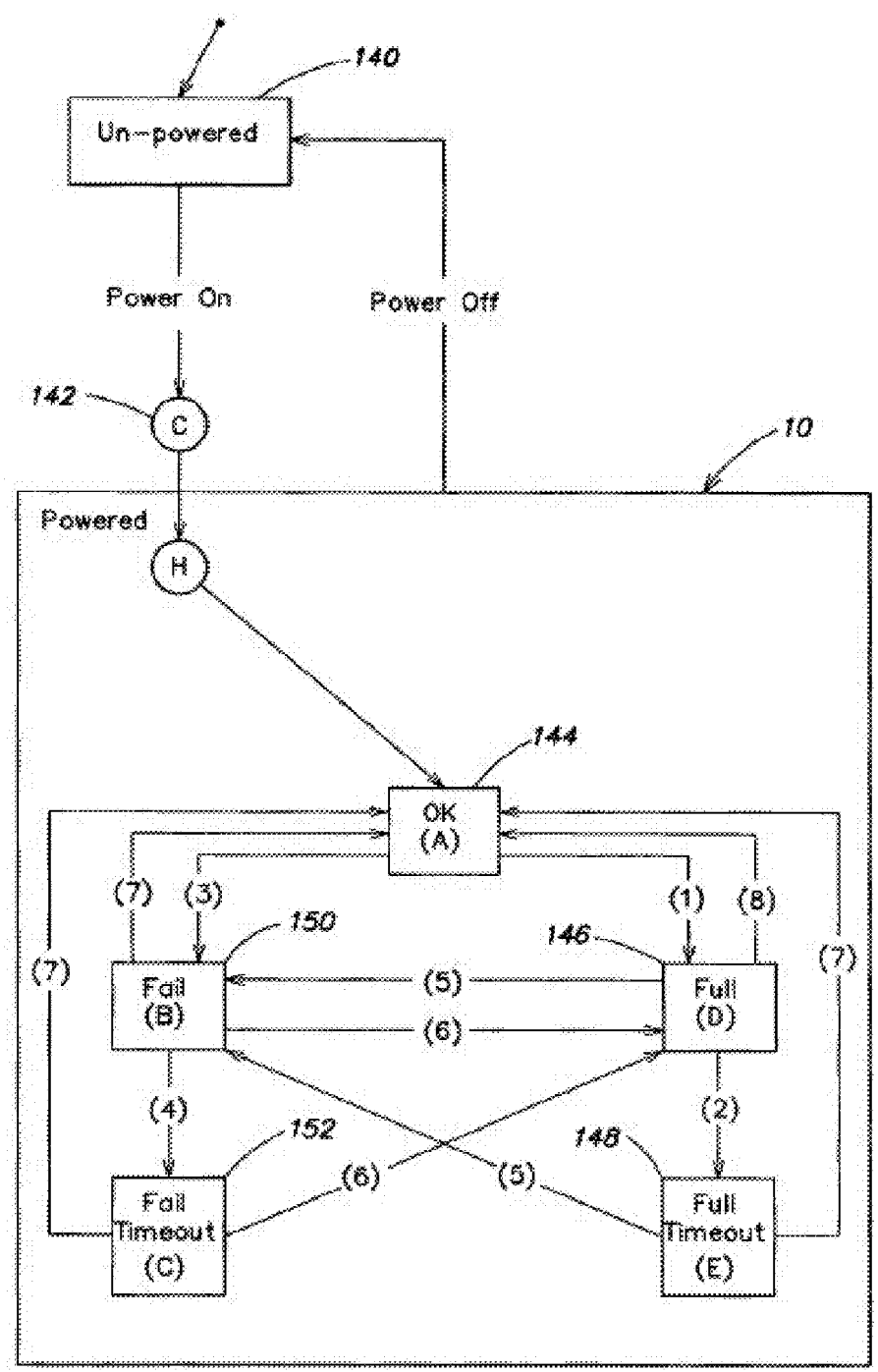
FIG. 4 is a system block diagram of a condensate state in accordance with one or more embodiments.
Figure 5:
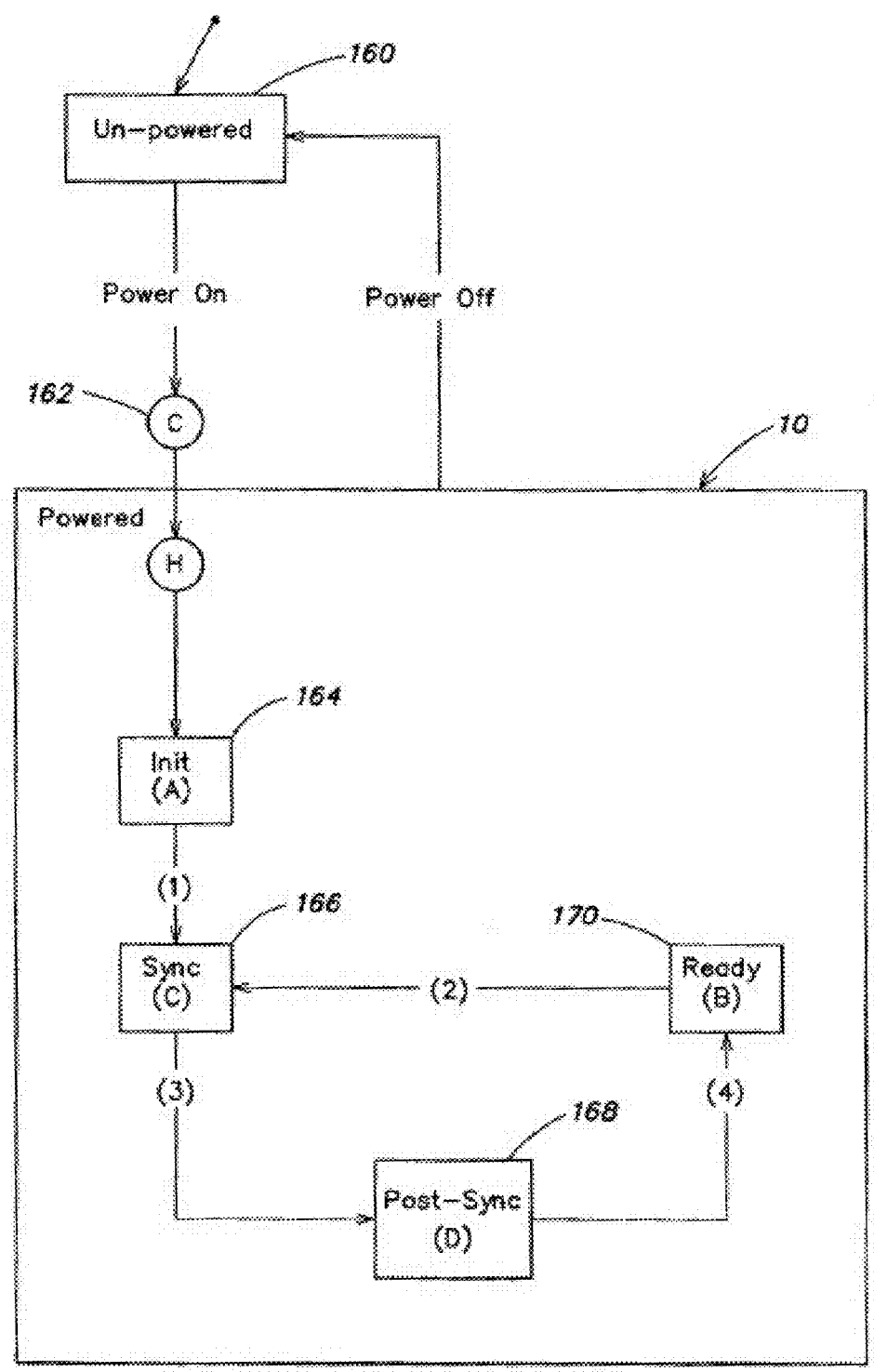
FIG. 5 is a system block diagram of a hot gas bypass valve state in accordance with one or more embodiments.
Figure 6:
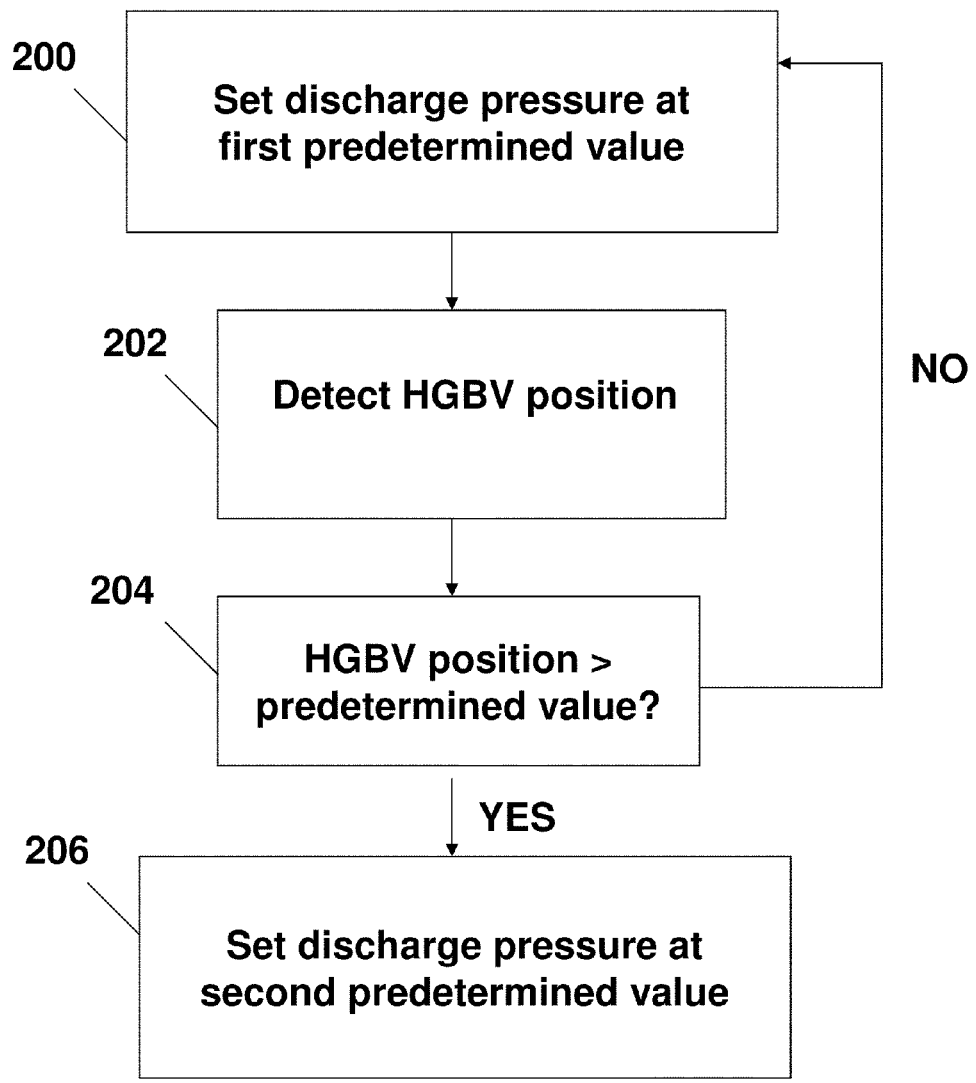
FIG. 6 is a system block diagram of hot gas bypass valve control for refrigerant discharge pressure set point change in accordance with one or more embodiments.

Referring to FIGS. 5 and 6, the condensate state mode is illustrated in FIG. 4 and the hot gas bypass valve state mode is illustrated in FIG. 5. With particular reference to FIG. 4, when referencing the condensate state, the cooling unit transitions from an un-powered condition at 140 to a powered condition at 142. Once powered on, a normal condensate level is indicated at 144. When the condensate pan becomes full, the condition of the cooling unit transitions from the normal mode 144 to a full mode 146. When in full mode 146, a signal may be transmitted to the controller or some other visual or audible alarm to discharge the condensate pan. When a predetermined period of time expires, e.g., ten minutes, the state of the cooling unit transitions to a full timeout mode at 148. All other failures are indicated at 150 in FIG. 4. For example, fail mode 150 may be triggered when a sensor, e.g., a float sensor, fails to deliver a signal to the controller. As with mode 148, upon the expiration of a predetermined period of time, e.g., ten minutes, the state of the cooling unit transitions to a full timeout mode at 152. The failures indicated at 146, 148, 150 and 152 may be cured in which the cooling unit returns to its normal state at 144.

With reference to FIG. 5, when referencing the hot gas bypass valve state, the cooling unit transitions from an un-powered condition at 160 to a powered condition at 162. Once powered on, a command is issued (e.g., by the controller or network manager) to the bypass valve to a synchronize closed position at 164 in which a delay timer is set. Once synchronized, indicated at 166 in FIG. 5, the cooling unit transitions to a post-synchronized mode at 168 in which the bypass valve is reset to a position where it was before synchronization, if commanded by the controller or network manager. Upon a predetermined delay as determined by the delay timer, for example, the mode transitions from 168 to a ready mode at 170 in which the bypass valve position is recorded and re-commanded to synchronize. From this position, the cooling unit transitions back to mode 166 in which the bypass valve receives a command to synchronize. This command may include how long to keep the bypass valve closed and whether to return the valve to the previous position after synchronization.

While operating, the cooling unit 10 is configured to provide the system operator with the ability to set the operating environment to one of the following: spot cooling within a space; hot aisle cooling within a row of equipment racks; or rack air containment cooling, which is described in U.S. patent application Ser. Nos. 11/335,874, 11/335,856 and 11/335,901 discussed above. When configured for spot cooling, the controller may be selected to one of the following control methods: proportional control, which modulates the bypass valve and fan speeds at certain set points and dead bands; or discrete control (e.g., energy saving), which closes the bypass valve and the compressor runs when the return or remote air temperature at the cooling unit exceeds a certain threshold. When employing a remote air sensor in in-row configurations, the sensor is located adjacent the front of the rack. The compressor is turned off when the temperature at the cooling unit is less than or equal to the threshold temperature. When configured for hot aisle and cold aisle environments, the proportional control method may be employed. Similarly, when configured for rack air containment, the proportional control method may be used. When in operation, the cooling unit may be configured to protect and maximize the life of the compressor.

The controller and/or system manager of the cooling unit 10 may be configured to monitor and control other aspects of the cooling unit. For example, the controller and/or system manager may be configured to monitor and control power management, event management, user interfaces, testing requirements, condensate monitoring, leak monitoring, run hour counters, maintenance alarms, fault alarms and user inputs and outputs.

Specifically, with certain prior art cooling systems, the compressor has a tendency to cycle on and off during operation, thereby creating a situation in which hot air flows from the hot aisle to the cold aisle since the evaporator fans are operating when the compressor is turned off. In some applications, it may be undesirable to cycle the cooling system on and off. It may therefore be preferred to reduce cooling capacity without powering down the cooling system. As discussed above, in order to address unwanted cycling of the compressor, the cooling unit 10 includes the bypass valve 64 and evaporator fans 68. In a certain embodiment, the bypass valve 64 is an electronic expansion valve offered by Sporlan Division of Parker-Hannifin Corporation of Washington, Mo. The temperature of air entering the evaporator section 12 may be monitored and used as a set temperature in accordance with one or more embodiments pertaining to various types of cooling units, including air-cooled units, self contained air-cooled units and water-cooled AC units. Cooling capacity control may be achieved in one of three modes. They are: (1) spot-proportional mode (e.g., in a data closet); (2) in-row mode (e.g., in hot aisle/cold aisle applications within a data center); (3) rack air containment systems (RACS; e.g., in enclosed systems having at least one equipment rack and at least one cooling unit; and (4) hot aisle containment (HACS) mode).

Cooling load may vary over time. In circumstances where the cooling load is minimal, the temperature of the air entering the cooling unit 10 may drop so that the temperature approximates the cooling unit's set temperature. In circumstances where the air temperature entering, for example a lower module of, the cooling unit approaches the set temperature, the cooling unit's cooling capacity may be reduced by bypassing hot gas back to the evaporator 44 with the bypass valve 64 via conduit 66. There are two methods used to reduce (or regulate) the cooling unit's cooling capacity. They are: (1) use of the hot gas bypass valve; and (2) use of the variable evaporator fan speed and the hot gas bypass valve together.

In another embodiment, by reducing the speed of the evaporator fans, the capacity of the cooling unit 10 is reduced. This results in the reduction of supply air temperatures, with the bypass valve regulating supply air temperature in proportional mode. Specifically, in a particular embodiment, the default supply air set point in spot-proportional modes may be 57° F. In another particular embodiment, the default supply air set point in in-row and containment air system mode may be 68° F., which is the minimum air temperature according to ASHRAE standards. As discussed above, the temperature sensor e.g., sensor 60, installed within the system adjacent the input of the compressor 30 may monitor the return gas temperature of coolant entering into the compressor. To keep the return coolant less than a predetermined temperature (e.g., 68° F.) so as to ensure the protection of the compressor 30, the bypass valve 64 may be throttled and the evaporator fan speed may be reduced, even when there is a demand for coolant bypass.

When IT load drops, the demand for cooling decreases. A cooling unit may turn its cooling capacity down in response to a drop in IT load. In some embodiments, the cooling unit may open a hot gas bypass valve to reduce its cooling capacity. A cooling unit controller can regulate a hot gas bypass valve's opening. The more the valve is open, the more hot gas refrigerant is diverted. In some non-limiting embodiments, a cooling unit may have a nominal cooling capacity of around 10 kW when operating at normal cooling loads. Thus, the cooling unit may have a cooling capacity of about 10 kW when the hot gas bypass valve is closed. By opening the hot gas bypass valve, the cooling capacity may be reduced, for example, to as low as about 2 kW capacity.

The compressor of a cooling unit typically consumes the most power, and compressor power draw is generally related to refrigerant discharge pressure or condensing pressure. Power consumption of the compressor generally increases with increasing discharge pressure. The term discharge pressure may be used interchangeably with condensing pressure and compressor discharge pressure for purposes of this disclosure.

A proportional-integral-derivative (PID) control loop may be part of the controller. A PID set point for discharge (condensing) pressure may be specific for a particular cooling unit. The discharge pressure set point may also vary with saturation or condensing temperature as well as with one or more characteristics of the refrigerant used. In accordance with one or more embodiments, the default condensing (discharge) pressure set point in a cooling unit may vary with refrigerant. For example, the default condensing pressure with R410A refrigerant may be 340 psig with a corresponding saturation or condensing temperature of 105° F. at this pressure. Likewise, a cooling unit with R22 refrigerant may have a 210 psig set point discharge pressure with a corresponding saturation or condensing temperature of 105° F. at this pressure. Different cooling units may have lower or higher default condensing pressure set points. Cooling units may generally include a controller configured to regulate condensing pressure via either regulating air-cooled condenser fan's speed in air-cooled AC unit or regulating condenser water flow rate entering water or water/glycol mixture cooled condenser in water-cooled AC units.

Reducing discharge pressure to reduce power draw when the hot gas bypass valve is closed may introduce various problems to the refrigerant system. The capacity of an expansion valve is generally related to a pressure drop across the valve. As an example of non-limiting operating conditions, liquid R410A refrigerant at 340 psig and 95° F. may enter an expansion valve while the refrigerant exiting the valve may be a liquid/gas mixture at 180 psig and 60° F. If the capacity of the valve with 160 psi pressure drop is 10 kW, then when the cooling capacity is around 10 kW the valve may function without issue. When the condensing pressure drops, however, the refrigerant pressure at the expansion valve outlet has to drop to maintain the 10 kW capacity and the valve may start having control issues. This may cause liquid refrigerant to enter the compressor and damage the compressor. When a thermostatic or any other expansion valve has control issues, some liquid refrigerant may enter the compressor and the compressor may get damaged or its useful life reduced.

An electronic hot gas bypass valve may be a step valve having a number of steps, each correlating to a degree of valve opening. The number of steps may vary from valve to valve. One non-limiting example is a stepped hot gas bypass valve that has 1596 steps. The controller may generally be configured to control or regulate valve position. For example, the controller may open and close the valve from a single step to the maximum number of steps, for example, 1596 steps. The hot gas flow rate passing through the valve will be different depending on the degree of opening of the hot gas bypass valve.

In accordance with one or more embodiments, discharge pressure may be reduced when the hot gas bypass valve is opened while avoiding any detrimental effects thereof. The condenser pressure set point may be adjusted based on a degree of opening of the hot gas bypass valve. The controller may be configured to detect, determine or control the degree of opening or step position of the hot gas bypass valve. For example, as discussed above, the controller may adjust the hot gas bypass valve positioning or degree of opening based on cooling requirements so as to adjust the cooling capacity of the cooling unit. The controller may be further configured to adjust discharge pressure based on the degree of opening of the hot gas bypass valve. In some embodiments, discharge pressure may be altered from a first preset value to a second preset value in response to the hot gas bypass valve being opened above a threshold amount or above a predetermined percentage. The first preset value may be a default value. In some non-limiting embodiments, the threshold amount of valve opening may be about 35%. In at least one embodiment, the discharge pressure may be reduced from a first preset value to a second preset value when the hot gas bypass valve is opened between about 35% and 75%, for example, 50%. In other embodiments, discharge pressure set point may be correlated to a degree of opening of the hot gas bypass valve.

In accordance with one or more embodiments, cooling systems may establish and/or maintain one or more predetermined discharge pressure set points. In some embodiments, there may be a known correlation between a desired discharge pressure set point and a degree of opening of the hot gas bypass valve. Process control and various mechanics may be used to adjust the discharge pressure set point. In some embodiments, the water flow rate to the condenser may be increased to in turn decrease the discharge pressure. In at least one embodiment, the condenser fan may be manipulated to adjust discharge pressure.

Without wishing to be bound to any particular theory, when enough high pressure and high temperature (typically 160° F.) hot gas from the electronic hot gas bypass valve enters the distributor from its side port and mixes with cool refrigerant (gas/liquid mixture) from the expansion valve, the chance of having liquid enter the compressor is reduced or eliminated. Thus, the condensing set pressure may be reduced without potential compressor damage when the electronic hot gas bypass valve is open more than a predetermined amount.

In some non-limiting embodiments, cooling capacity of a cooling unit may be reduced by opening the hot gas bypass valve in response to a reduction in cooling requirements. As illustrated in FIG. 6, a controller may monitor the degree of opening of the hot gas bypass valve. In some embodiments, the controller may maintain a default discharge pressure or first preset discharge pressure at 200 until the hot gas bypass valve reaches a predetermined percentage or threshold value. For example, the threshold value may be a number of steps in a step valve or other measure of degree of opening, such as a percentage. The position is detected at 202, and it is determined whether the position is greater than a predetermined value at 204. Next, when the predetermined percentage or threshold value is reached, the controller may adjust the discharge pressure to a second preset or second predetermined discharge pressure at 206. Otherwise, the cycle begins again. In at least one embodiment, discharge pressure set point may be correlated to a degree of opening of the hot gas bypass valve. The first preset discharge pressure may be associated with a first cooling requirement or capacity, and the second preset discharge pressure may be associated with a second cooling requirement or capacity. In at least one embodiment, the first preset discharge pressure may be associated with nominal cooling capacity, and the second preset discharge pressure may be associated with a partial cooling requirement.

In accordance with one or more embodiments, opening the hot gas bypass valve may result in capacity reduction. For example, if the compressor refrigerant flow rate [M_comp] is 10 lbs/hr, then when the electronic hot gas bypass valve is closed, 10 lbs/hr of hot gas refrigerant is sent to condenser, and it becomes liquid before travelling through the filter drier, expansion valve, distributor, evaporator and sucked by compressor. In one specific embodiment, if the hot gas bypass valve is opened 50%, for example 798 steps in a 1596 step valve, the hot gas refrigerant flow rate passing through the valve [M_hgbv] may be 4 lb/hr. Thus, only the remaining 6 lb/hr of hot gas enters the condenser [M_condenser or M_liquid], becomes liquid and passes through expansion valve to facilitate cooling. The M_hgbv amount of hot gas refrigerant will not be used in cooling and this high pressure (since it does not go though expansion valve to expand), high temperature gas will mix with the lower pressure liquid/gas mixture from the expansion valve. Thus, in this example, a total of 10 lb/hr refrigerant will enter the evaporator. The total cooling capacity may be reduced since the bypassed hot gas refrigerant mixes and heats cool refrigerant from the expansion valve. In the above example:

$$M\_comp = M\_evaporator = M\_hgbv + M\_condenser \quad (1)$$

In accordance with one or more embodiments, lowering the condensing pressure will generally yield lower compressor power consumption leading to increased efficiency of the cooling unit. In one non-limiting embodiment, lowering the discharge pressure set point to 260 psig from 340 psig in a particular cooling unit with R410A refrigerant when the electronic hot gas bypass valve is open between about 35% and 75% will reduce the compressor power draw approximately by 500 watts or by about 25% Thus, cooling efficiency may be increased at lower IT loads. The following non-limiting example illustrates this point:

Cooling capacity of a cooling unit at 85° F. return air temperature: 5.8 kW
Power consumption at 340 psig discharge pressure: 2.41 kW
Coefficient of performance (COP): 5.8/2.41=2.4
Power consumption at 260 psig discharge pressure: 1.91 kW
Revised COP: 5.8/1.91=3.0

In accordance with one or more embodiments, a controller may determine a parameter or a condition of a hot gas bypass valve. For example, the controller may determine a degree of opening or step position of the hot gas bypass valve. The controller may vary a discharge pressure set point in response to variations relating to the hot gas bypass valve. For example, the controller may establish a first discharge pressure, such as a default discharge pressure set point, based on a fully closed hot gas bypass valve. The controller may establish a second discharge pressure set point based on an amount by which the hot gas bypass valve is opened. In some embodiments, the controller may establish a second discharge pressure set point upon the hot gas bypass valve percentage of opening exceeding a threshold value. For example, in one non-limiting embodiment, a controller may establish a first discharge pressure set point of about 340 psig and switch to a second discharge pressure set point of about 260 psig in response to the hot gas bypass valve registering a predetermined threshold degree of opening.

In accordance with one or more embodiments, lowering the discharge pressure set point when the hot gas bypass valve is open will reduce fluctuations in evaporating and condensing refrigerant pressures which may occur when electronic hot gas bypass valve is open and condenser inlet water or water/glycol mixture temperature is less than 55 F which is very common in cold climates in winter and spring times. In general:

$$\text{Thermostatic Expansion Valve (TXV) Rating} = \text{Actual cooling capacity/TXV capacity} \quad (2)$$

In one non-limiting example, the assumed capacity of an expansion valve may be about 10 kW with a 160 psi pressure drop across the valve. When the electronic hot gas bypass valve is about 50% open, the cooling capacity of the cooling unit may be brought down to about 5 kW since the amount of liquid refrigerant passing through the expansion valve is reduced. When the electronic hot gas bypass valve is 100% open, the cooling capacity may be reduced down to 2 kW values. When this occurs, the TXV rating may be brought down to the 20% range, and unacceptable condensing and evaporating pressure fluctuations to the condenser may be experienced when condenser inlet water temperature for water-cooled condenser or entering air temperature to air-cooled condenser is low enough. In accordance with one or more embodiments, by lowering the condensing pressure, for example, down to 260 psig, the refrigerant pressure fluctuations may improve or disappear. Lowering condensing pressure, for example down to 260 psig, may reduce the TXV capacity. This may, in turn, increase the TXV rating, resolving the TXV control issues.

When the electronic hot gas bypass valve is open above the threshold level, for example, above about 35%, the load on the thermostatic expansion valve is reduced. The thermostatic expansion valve can better control superheat at lower condensing temperatures and hot gas bypassed into the evaporator inlet will maintain good superheat. Liquid flooding back to the compressor may be eliminated at lower discharge pressure.

In some embodiments, condenser water inlet temperature may be as low as about 45° F., such as during winter days, particularly in buildings in which the condenser water loop and economizer heat exchangers are fed from the same dry-cooler or cooling tower. When a water or water/glycol mixture cooled cooling unit, which is equipped with an electronic hot gas bypass valve to reduce or turn down its cooling capacity, is running at low cooling capacity and condenser entering water temperature is as low as about 45° F., fluctuations in refrigerant pressures are known to occur which may harm the cooling unit. For example, with condenser inlet water temperatures of below about 55° F., and with the electronic hot gas bypass valve open more than 50%, such fluctuations have been observed. In accordance with one or more embodiments of the present disclosure, lower or reducing discharge pressure set point reduces or eliminates such refrigerant pressure fluctuations. In some non-limiting embodiments, by lowering condensing pressure, for example, by increasing condenser water flow rate, the capacity of the thermostatic expansion valve is reduced, eliminating undesirable refrigerant fluctuations.

Thus, in accordance with one or more embodiments, minimum condenser water inlet temperature for a water-cooled cooling unit may also be reduced. Typical entering condenser water temperatures at the default set point discharge pressure when the system is operating at nominal cooling capacity may be at or above about 55° F. In some non-limiting embodiments, condenser water inlet temperature may be reduced to as low as about 45° F. at lower discharge pressures without introducing refrigerant pressure fluctuations when electronic hot gas bypass valve is open.

Figure 7:
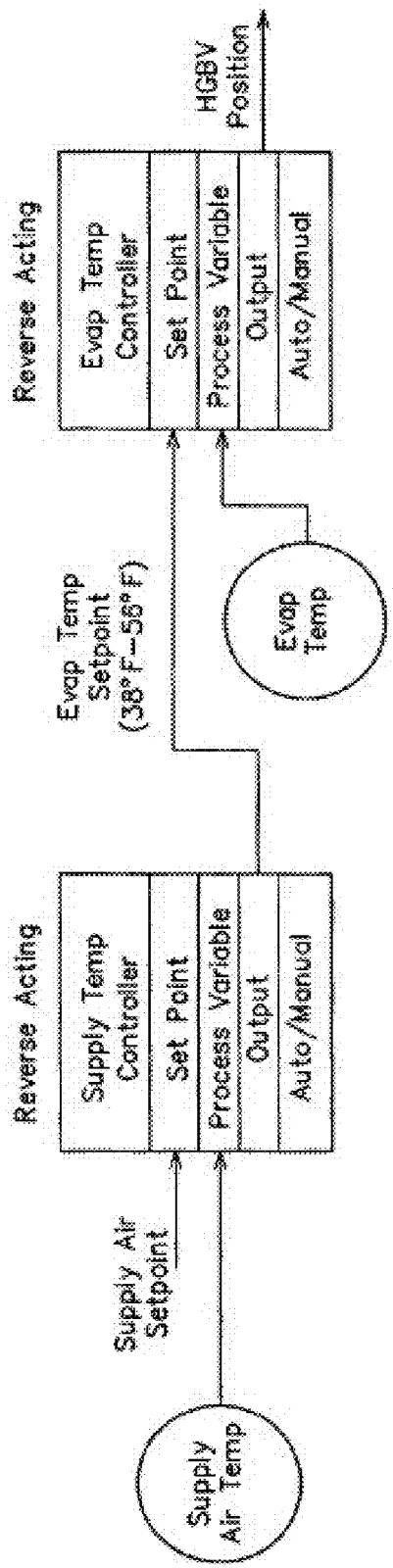
FIG. 7 is a system block diagram pertaining to supply air temperature control in accordance with one or more embodiments.

When controlling the bypass valve in discrete capacity control mode, the bypass valve is normally held closed. If the discharge pressure exceeds a certain threshold, e.g., 520 psig, the bypass valve may be opened to a maximum of fifty percent at an elevated predetermined pressure, e.g., 550 psig. With reference to FIG. 7, supply air temperature may be controlled with the electronic HGBV. For example, a PID controller may manipulate the electronic HGBV to (1) maintain the evaporating temperature within a safe range, e.g., between 38° F. and 56° F., and (2) maintain the supply air temperature at the predetermined, user-configurable supply air set point, e.g., between 52° F. and 73° F.

Figure 8:
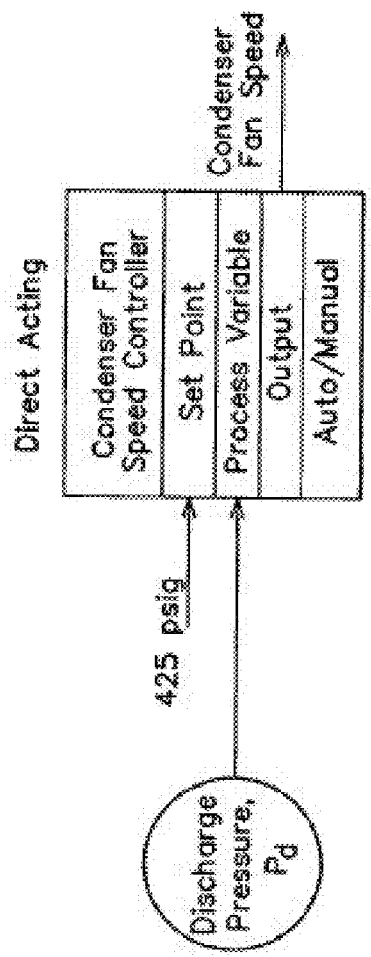
FIG. 8 is a system block diagram of discharge pressure control via regulating condenser fan speed of air-cooled cooling units in accordance with one or more embodiments.

In certain other embodiments pertaining to air-cooled units, and with reference to FIG. 8, condenser fan speed may be controlled. In all modes (discrete capacity and proportional capacity modes), the speed of the condenser fan in self contained air cooled cooling unit or air-cooled cooling units may be regulated by a PID controller to maintain a predetermined discharge pressure, e.g., 425 psig.

Figure 9:
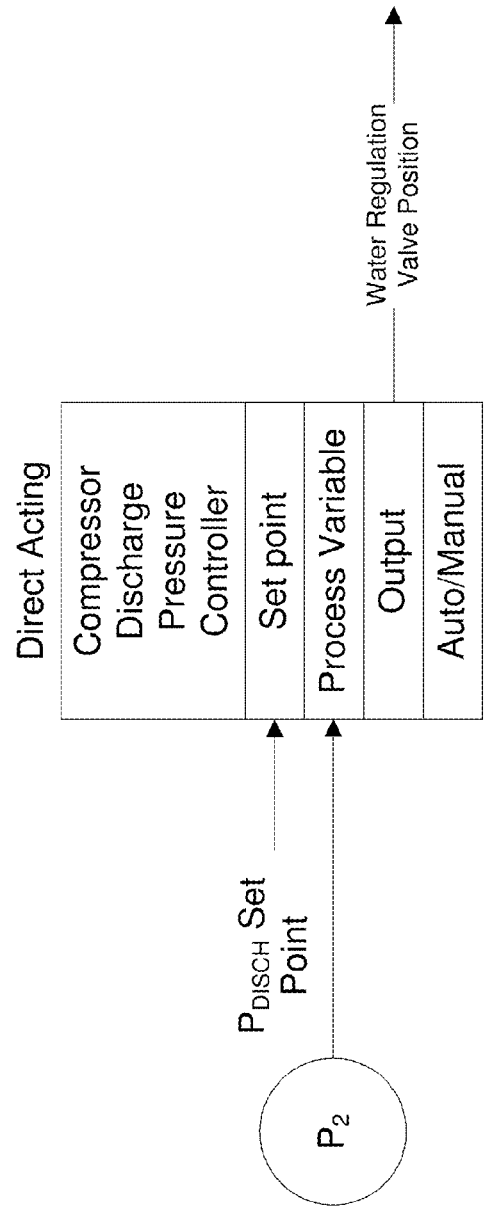
FIG. 9 is a system block diagram of discharge pressure regulation in water-cooled cooling units in accordance with one or more embodiments.

In certain other embodiments pertaining to water-cooled units, and with reference to FIG. 9, the compressor discharge pressure may be controlled. In all modes the opening of 3-way water regulating valve in water or water/glycol mixture cooled units may be regulated by a PID controller to maintain a predetermined discharge pressure, e.g., 340 psig.

The controller and the components of the cooling unit may be configured, by employing a polynomial equation having coefficients unique to the compressor, coolant evaporating temperature and coolant condensing temperature. Specifically, for each cooling unit 10 used in the data center or equipment room, the compressor 30 has a set of coefficients to calculate cooling output, mass flow rate, energy efficiency rating, and current draw. Each parameter set may consist of up to ten coefficients, and as a result, the compressor cooling capacity may be calculated by firmware provided in the controller. The coolant pressures are measured by the pressure transducers, and evaporating and condensing temperatures may be calculated from the coolant evaporating and condensing pressures and/or by temperature sensors. Cooling capacity may also be determined. The controller may generally be programmed with relevant equations and coefficients to output desired values. For example, the controller may calculate cooling capacity of a cooling unit as disclosed in U.S. patent application Ser. No. 11/504,370, incorporated above by reference in its entirety for all purposes.

In certain embodiments, the cooling unit may be configured to provide uninterruptible cooling. Specifically, it has been discovered that by bypassing coolant from high pressure hot gas side to the pressure suction side before the discharge pressures reach the predetermined cutoff pressure, the coolant flow rate to the condenser is reduced to reduce the discharge pressure of coolant exiting the condenser. In certain applications in which air temperature entering the condenser coil is relatively high, e.g., 100° F. or higher, the blockage of air flow into the condenser may occur. This may result in very high condensing pressures that require the high pressure cutoff switch to activate thereby cutting off power to the compressor. Obviously, the exposure to elevated temperatures may result in damage to the electronic equipment housed in the equipment storage racks.

In one embodiment, the pressure transducer at the discharge pipe may be employed to measure pressure of coolant entering the condenser. As discussed above, the cooling unit may be provided with a pressure cutoff switch, which cuts off the power when the condensing pressure reaches a predetermined pressure, e.g., 550 psig. If, for example, the condensing pressure reaches a threshold predetermined pressure, e.g., 525 psig, the cooling unit may be configured to have the bypass valve open to allow a portion of the high pressure coolant to return back to the condenser. The coolant mass flow rate to the condenser coil is reduced with the heat rejection and the condenser pressure is limited so that the pressure within the condenser is below 550 psig. As a result, there may be a drop in cooling capacity, but total loss of cooling may be prevented since the compressor remains in operation.

Thus, it should be observed that by controlling the speed of the condenser fans, the condensing pressure may be reduced as needed, extremely high or low evaporating temperatures may be avoided, and high suction temperatures to the compressor may be avoided. In addition, the capacity of the cooling unit may be controlled. By manipulating the hot gas bypass valve, the condensing pressure may be reduced to prevent the cooling unit from reaching a high threshold (cutoff) pressure, the evaporating temperature may be controlled and the air temperature may be controlled as well. Also, the hot gas bypass valve may be manipulated to open during a compressor "off cycle" to expedite the coolant pressure equalization for faster and quieter compressor restarts. By closing the hot gas bypass valve periodically, the delivery of coolant to the condenser may be increased to force the delivery of oil that may be trapped back to the compressor.

As referenced above, in one embodiment, the controller may be a separately dedicated unit that controls the operation of one or more of the cooling units. In another embodiment, a main controller may be provided in one of the cooling units in place of one of the subservient controller units, with the cooling unit having the controller functioning as the main cooling unit and the other cooling units functioning as subservient cooling units. In yet another embodiment, the operation of the cooling unit may be under the control of an integrated data center control and monitoring system with each cooling unit rack having a controller that communicates with the other cooling units over the network. In one such embodiment, the controller may communicate with a data center control system to provide status of the components of the cooling system and to receive control commands for the data center control system. In one embodiment, each cooling unit includes a controller that communicates with the data center controller over a network, such as a CAN Bus network, and in one such embodiment, the data center controller may be implemented using the integrated data center control and monitoring system, such as the InfraStruXure™ data center manager sold by American Power Conversion Corporation of West Kingston, R.I., the assignee of the present application. When used with such an integrated control and monitoring system, the cooling unit is easily removable for service and relocation to another position within the data center. The cooling unit may also be integrated into an existing cooling system of the building housing the data center, for example and used in conjunction with one or more CRAC units to provide additional cooled air where needed in the data center.

The cooling unit may be provided with a predictive failure determination module by utilizing a number of factors. Specifically, through the controller, each cooling unit may be designed to notify the data center operator when certain parts, such as motors, fans, or any other part subject to wear, are near the ends of their useful life. The provision of such a module will enable a reasonably timed preventative maintenance action to be performed and to save possible downtime. The notification may be delivered to the display of the cooling unit, or provided to the operator of the data center through the integrated control and monitoring system. In addition, a controller of the cooling unit configured as a main controller may compensate for a failure of a particular cooling unit by increasing the output of other cooling units positioned near the failed cooling unit.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A method of improving efficiency of a cooling unit associated with a data center at a partial cooling load, comprising:
   detecting a degree of opening of an electronic expansion hot gas bypass valve configured to divert a portion of coolant from a compressor to a heat exchanger of the cooling unit based on the partial cooling load of the data center, the electronic expansion hot gas bypass valve being a step valve having a plurality of steps each correlating to a degree of opening; and
   adjusting a discharge pressure set point based on the detected degree of opening of the electronic expansion hot gas bypass valve to prevent cycling of the compressor.

2. The method of claim 1, wherein the discharge pressure set point is adjusted in response to the detected degree of opening exceeding a threshold value.

3. The method of claim 2, wherein the threshold value is a number of steps of the plurality of steps.

4. The method of claim 2, wherein the discharge pressure set point is reduced in response to the degree of opening exceeding the threshold value.

5. The method of claim 1, wherein adjusting the discharge pressure set point comprises correlating the discharge pressure set point to the detected degree of opening.

6. The method of claim 1, further comprising adjusting the degree of opening of the hot gas bypass valve in response to a change in cooling demand.

7. The method of claim 1, wherein the discharge pressure set point is set to a first preset value when the electronic expansion hot gas bypass valve is opened less than 35%, and is adjusted to a second preset value when the electronic expansion hot gas bypass valve is opened between 35% and 75%.

8. The method of claim 1, wherein the electronic expansion hot gas bypass valve is configured to be opened in a range of 1 step to 1596 steps.

9. The method of claim 1, wherein the discharge pressure set point is adjusted when the electronic expansion hot gas bypass valve transitions from an initial degree of opening to the detected degree of opening.

10. A data center cooling unit, comprising:
   a compressor to provide coolant under pressure;
   a condenser in fluid communication with the compressor;
   an evaporator in fluid communication with the condenser and the compressor;
   an electronic expansion hot gas bypass valve in fluid communication with the compressor and the evaporator and configured to divert a portion of coolant from the compressor to the evaporator in response to a decrease in a data center cooling demand, the electronic expansion hot gas bypass valve being a step valve having a plurality of steps each correlating to a degree of opening; and
   a controller configured to detect the degree of opening of the electronic expansion hot gas bypass valve and to adjust a discharge pressure set point in response to the detected degree of opening to prevent cycling of the compressor.

11. The cooling unit of claim 10, wherein the controller is configured to adjust the discharge pressure set point in response to the hot gas bypass valve being opened beyond a threshold percentage.

12. The cooling unit of claim 10, further comprising a source of condenser cooling medium at below 55° F. fluidly connected to the condenser in water cooled units.

13. The cooling unit of claim 10, wherein the controller comprises an integrated data center control and monitoring system.

* * * * *

UNITED STATES PATENT AND TRADEMARK OFFICE
CERTIFICATE OF CORRECTION

PATENT NO. : 9,568,206 B2  Page 1 of 1
APPLICATION NO. : 12/545106
DATED : February 14, 2017
INVENTOR(S) : Ozan Tutunoglu It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1175 days.

Signed and Sealed this
Twenty-fifth Day of September, 2018

Andrei Iancu
*Director of the United States Patent and Trademark Office*